United States Patent
Lim et al.

(10) Patent No.: US 12,185,291 B2
(45) Date of Patent: Dec. 31, 2024

(54) METHOD FOR CONFIGURING SIGNAL FIELD IN WIRELESS COMMUNICATION SYSTEM

(71) Applicant: LG ELECTRONICS INC., Seoul (KR)

(72) Inventors: Dongguk Lim, Seoul (KR); Jinmin Kim, Seoul (KR); Eunsung Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 681 days.

(21) Appl. No.: 17/288,444

(22) PCT Filed: Oct. 23, 2019

(86) PCT No.: PCT/KR2019/013947
§ 371 (c)(1),
(2) Date: Apr. 23, 2021

(87) PCT Pub. No.: WO2020/085783
PCT Pub. Date: Apr. 30, 2020

(65) Prior Publication Data
US 2022/0007362 A1 Jan. 6, 2022

(30) Foreign Application Priority Data
Oct. 23, 2018 (KR) .................. 10-2018-0127039

(51) Int. Cl.
*H04W 72/0453* (2023.01)
*H04L 27/26* (2006.01)
*H04W 84/12* (2009.01)

(52) U.S. Cl.
CPC ..... *H04W 72/0453* (2013.01); *H04L 27/2613* (2013.01); *H04W 84/12* (2013.01)

(58) Field of Classification Search
CPC .................................................. H04W 72/0453
See application file for complete search history.

(56) References Cited

U.S. PATENT DOCUMENTS

| | | | |
|---|---|---|---|
| 2016/0112899 A1 | 4/2016 | Kenney et al. | |
| 2016/0127992 A1* | 5/2016 | Kenney | H04L 69/18 |
| | | | 370/311 |
| 2016/0323848 A1 | 11/2016 | Azizi et al. | |
| 2019/0116513 A1 | 4/2019 | Verma et al. | |
| 2019/0238301 A1* | 8/2019 | Verma | H04L 5/0046 |
| 2019/0364525 A1* | 11/2019 | Yu | H04L 27/26 |

(Continued)

FOREIGN PATENT DOCUMENTS

| | | |
|---|---|---|
| KR | 10-2016-0073319 A | 6/2016 |
| KR | 10-2017-0042370 A | 4/2017 |
| KR | 10-2017-0078628 A | 7/2017 |

*Primary Examiner* — Jason E Mattis
(74) *Attorney, Agent, or Firm* — BRYAN CAVE LEIGHTON PAISNER LLP

(57) ABSTRACT

An embodiment of the present invention relates to a technique for configuring a signal field in a wireless communication system. A receiving STA may receive and decode a PPDU. The PPDU may include a control information field, a plurality of signal fields, and a plurality of data fields. The control information field may be duplicated based on a first bandwidth, and the plurality of signal fields may be duplicated based on a second bandwidth. The second bandwidth may be set to be larger than the first bandwidth.

8 Claims, 34 Drawing Sheets

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

(56) References Cited

U.S. PATENT DOCUMENTS

| | | | |
|---|---|---|---|
| 2019/0373586 A1 | 12/2019 | Verma et al. | |
| 2020/0037288 A1* | 1/2020 | Huang | H04W 72/30 |
| 2020/0052832 A1* | 2/2020 | Tian | H04L 1/1614 |
| 2020/0112408 A1 | 4/2020 | Verma et al. | |
| 2020/0127681 A1* | 4/2020 | Verma | H04L 5/0044 |
| 2021/0135779 A1* | 5/2021 | Gan | H04L 1/0009 |
| 2021/0391947 A1* | 12/2021 | Jang | H04W 74/0808 |

* cited by examiner

FIG. 2
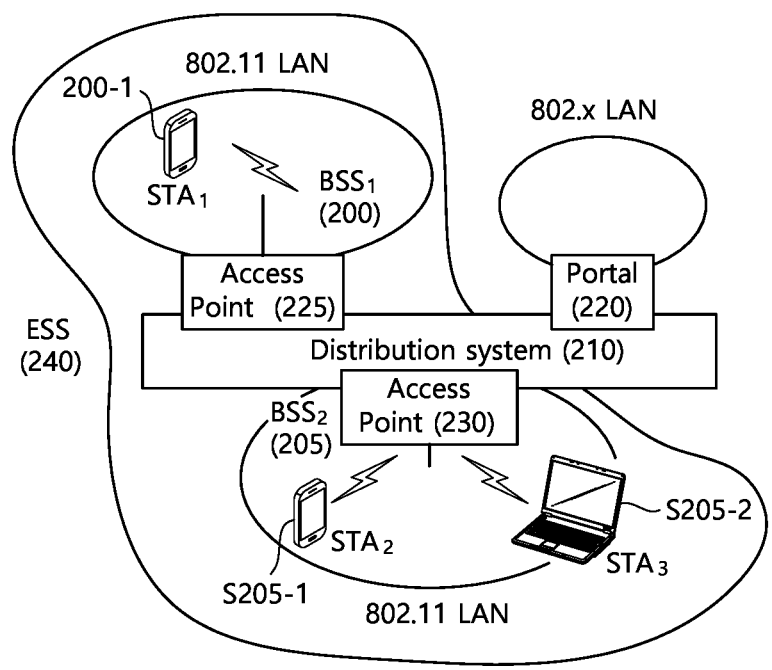
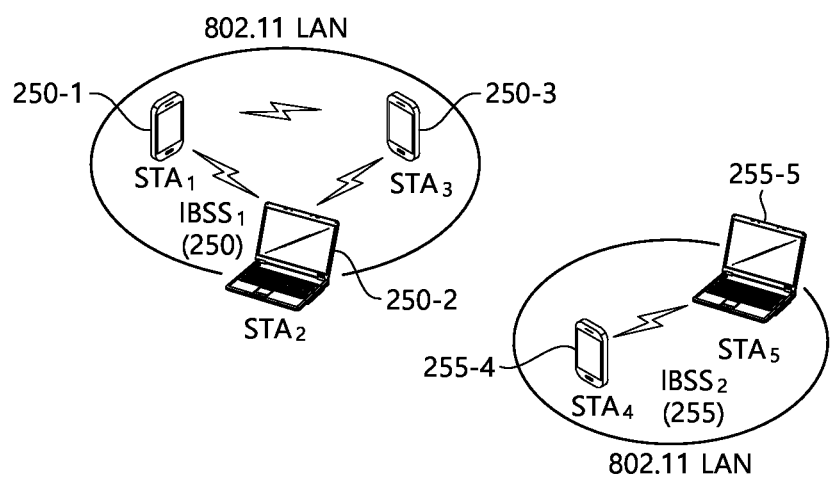

FIG. 4

PPDU Format (IEEE 802.11a/g)

| L-LTF | L-STF | L-SIG | Data |

HT PPDU Format (IEEE 802.11n)

| L-LTF | L-STF | L-SIG | SIG A | HT-STF | HT-LTF | ... | HT-LTF | Data |

VHT PPDU Format (IEEE 802.11ac)

| L-LTF | L-STF | L-SIG | VHT-SIG A | VHT-STF | VHT-LTF | VHT-SIG B | Data |

| 8μs | 8μs | 4μs | 4μs | 4μs | 8μs | 4μs | 4μs per symbol | | | |
|---|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

Variable durations per HE-LTF symbol

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

METHOD FOR CONFIGURING SIGNAL FIELD IN WIRELESS COMMUNICATION SYSTEM

This application is the National Stage filing under 35 U.S.C. 371 of International Application No. PCT/KR2019/013947, filed on Oct. 23, 2019, which claims the benefit of Korean Patent Application No. 10-2018-0127039, filed on Oct. 23, 2018, the contents of which are all hereby incorporated by reference herein in their entirety.

BACKGROUND OF THE DISCLOSURE

Field of the Disclosure

The present specification relates to a method for configuring a signal field and transmitting and receiving the signal field in various wireless communication systems including a wireless LAN system.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In addition, in a wireless local area network (WLAN), a method for configuring a frame has been improved in various ways. For example, in the conventional standard, a control field is configured based on a number of channels or frequency bands.

SUMMARY OF THE DISCLOSURE

Technical Objects

In order to provide a data rate that is higher than the 802.11ax standard, signal transmission using a wide bandwidth (e.g., a bandwidth of 320 MHz or wider) is being considered in the EHT standard. When performing signal transmission using a wide bandwidth, the same method as the conventional (or existing) standard (e.g., HE-SIG-B transmission method of the 802.11ax standard) may be used. However, in this case, a problem of increase in signal overhead may occur. Therefore, in case of transmitting a signal by using a wide bandwidth, a method for effectively notifying related information to STAs may be required.

Therefore, in embodiments according to the present specification, in case of transmitting signals to a plurality of STAs by using a wide bandwidth, a method for efficiently transmitting allocated STA control information to corresponding STAs may be proposed.

Technical Solutions

The present specification relates to a method being performed by a receiving station (STA) of a Wireless Local Area Network (WLAN) system.

The receiving STA according to an example of the present specification may receive a Physical layer Protocol Data Unit (PPDU) including a control information field, a plurality of Signal fields, and a plurality of Data fields.

The control information field according to an example of the present specification may include control information for interpreting the PPDU.

One control information field according to an example of the present specification may have a first bandwidth.

Within the PPDU, the control information field according to an example of the present specification may be duplicated based on the first bandwidth.

The plurality of Signal fields according to an example of the present specification may include a first Signal field and a second Signal field.

Each of the first Signal field and the second Signal field according to an example of the present specification may have a second bandwidth.

Each of the first Signal field and the second Signal field according to an example of the present specification may be duplicated based on the second bandwidth.

The second bandwidth according to an example of the present specification may be configured to be wider than the first bandwidth.

The receiving STA according to an example of the present specification may decode at least one of the plurality of Data fields, based on at least one of the first Signal field and the second Signal field.

Effects of the Disclosure

The present specification proposes technical features of transmitting signals through a wide bandwidth in various WLAN systems (e.g., IEEE 802.11be system). Based on various examples of the present specification, a signal field (e.g., SIG-B) is configured in the wide bandwidth, and the configured signal field may be transmitted or received.

Additionally, according to various examples of the present specification, a signal field may be transmitted through a larger frequency unit, and signal overhead may be reduced by performing transmission after duplicating the signal field within a designated frequency range.

BRIEF DESCRIPTION OF THE DRAWINGS

FIG. 2 is a conceptual view illustrating the structure of a wireless local area network (WLAN).

FIG. 4 illustrates an example of a PPDU used in an IEEE standard.

FIG. 18 illustrates an example of a PPDU being used in the present specification.

DESCRIPTION OF EXEMPLARY EMBODIMENTS

As used herein, a slash (/) or comma may indicate "and/or." For example, "A/B" may indicate "A and/or B," and therefore may mean "only A," "only B," or "A and B." Technical features that are separately described in one drawing may be implemented separately or may be implemented simultaneously.

As used herein, parentheses may indicate "for example." Specifically, "control information (EHT-Signal)" may mean that "EHT-Signal" is proposed as an example of "control information." Further, "control information (i.e., EHT-Signal)" may also mean that "EHT-Signal" is proposed as an example of "control information."

The following example of the present specification can be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification can be applied to the newly proposed EHT standard or IEEE 802.11be standard. In addition, an example of the present specification may be applied to the EHT standard or a new wireless LAN standard that is enhanced with IEEE 802.11be. In addition, an example of the present specification may be applied to a mobile communication system. For example, it may be applied to a mobile communication system based on LTE (Long Term Evolution) based on 3rd Generation Partnership Project (3GPP) standard and its evolution. In addition, an example of the present specification may be applied to a communication system of 5G NR standard based on 3GPP standard.

Hereinafter, in order to describe a technical feature of the present specification, a technical feature applicable to the present specification will be described.

Figure 1:
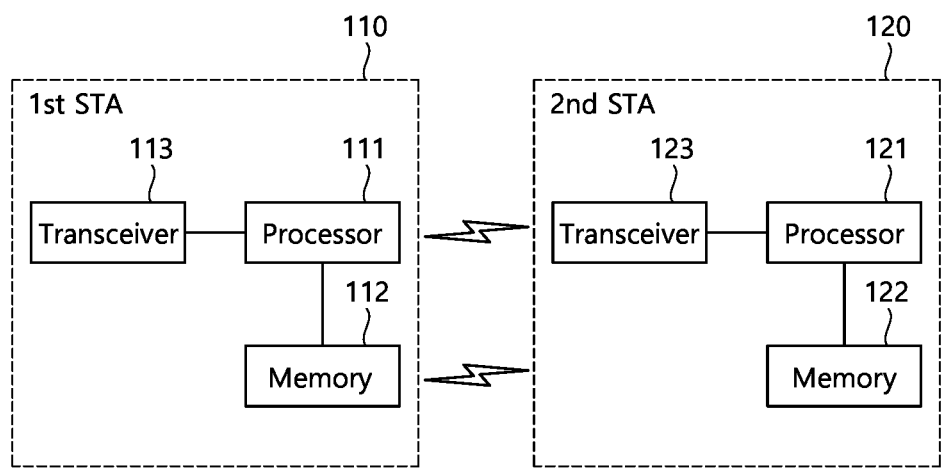
FIG. 1 shows an example of a transmitting apparatus and/or receiving apparatus of the present specification.

FIG. 1 shows an example of a transmitting apparatus and/or receiving apparatus of the present specification.

In the example of FIG. 1, various technical features described below may be performed. FIG. 1 relates to two stations (STAs). For example, STAs (110, 120) of the present specification may also be called in various terms such as a mobile terminal, a wireless device, a wireless transmit/receive unit (WTRU), a user equipment (UE), a mobile station (MS), a mobile subscriber unit, or simply a user. The STAs (110, 120) of the present specification may also be called in various terms such as a network, a base station, a node-B, an access point (AP), a repeater, a router, a relay, or the like. The STAs (110, 120) of the present specification may also be referred to as various names such as a receiving apparatus, a transmitting apparatus, a receiving STA, a transmitting STA, a receiving device, a transmitting device, or the like.

For example, the STAs (110, 120) may serve as an AP or a non-AP. That is, the STAs (110, 120) of the present specification may serve as the AP and/or the non-AP.

The STAs (110, 120) of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs (110, 120) of the present specification may include a medium access control (MAC) conforming to the IEEE 802.11 standard and a physical layer interface for a radio medium.

The first STA (110) may include a processor (111), a memory (112), and a transceiver (113). The illustrated process, memory, and transceiver may be implemented individually as separate chips, or at least two blocks/functions may be implemented through a single chip.

The transceiver (113) of the first STA performs a signal transmission/reception operation. Specifically, an IEEE 802.11 packet (e.g., IEEE 802.11a/b/g/n/ac/ax/be, and so on) may be transmitted/received.

For example, the first STA (110) may perform an operation intended by an AP. For example, the processor (111) of the AP may receive a signal through the transceiver (113), process a reception (RX) signal, generate a transmission (TX) signal, and provide control for signal transmission. The memory (112) of the AP may store a signal (e.g., RX signal) received through the transceiver (113), and may store a signal (e.g., TX signal) to be transmitted through the transceiver.

For example, the second STA (120) may perform an operation intended by a non-AP STA. For example, a transceiver (123) of a non-AP performs a signal transmission/reception operation. Specifically, an IEEE 802.11 packet (e.g., IEEE 802.11a/b/g/n/ac/ax/be packet, and so on) may be transmitted/received.

For example, a processor (121) of the non-AP STA may receive a signal through the transceiver (123), process an RX signal, generate a TX signal, and provide control for signal transmission. A memory (122) of the non-AP STA may store a signal (e.g., RX signal) received through the transceiver (123), and may store a signal (e.g., TX signal) to be transmitted through the transceiver.

For example, an operation of a device indicated as an AP in the specification described below may be performed in the first STA (110) or the second STA (120). For example, if the first STA (110) is the AP, the operation of the device indicated as the AP may be controlled by the processor (111) of the first STA (110), and a related signal may be transmitted or received through the transceiver (113) controlled by the processor (111) of the first STA (110). In addition, control information related to the operation of the AP or a TX/RX signal of the AP may be stored in the memory (112) of the first STA (110). In addition, if the second STA (120) is the AP, the operation of the device indicated as the AP may be controlled by the processor (121) of the second STA (120), and a related signal may be transmitted or received through the transceiver (123) controlled by the processor (121) of the second STA (120). In addition, control information related to the operation of the AP or a TX/RX signal of the AP may be stored in the memory (122) of the second STA (120).

For example, in the specification described below, an operation of a device indicated as a non-AP (or user-STA) may be performed in the first STA (110) or the second STA (120). For example, if the second STA (120) is the non-AP, the operation of the device indicated as the non-AP may be controlled by the processor (121) of the second STA (120), and a related signal may be transmitted or received through the transceiver (123) controlled by the processor (121) of the second STA (120). In addition, control information related to the operation of the non-AP or a TX/RX signal of the non-AP may be stored in the memory (122) of the second STA (120). For example, if the first STA (110) is the non-AP, the operation of the device indicated as the non-AP may be controlled by the processor (111) of the first STA (110), and a related signal may be transmitted or received through the transceiver (113) controlled by the processor (111) of the first STA (110). In addition, control information related to the operation of the non-AP or a TX/RX signal of the non-AP may be stored in the memory (112) of the first STA (110).

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs (110, 120) of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs (110, 120) of FIG. 1. For example, in the following example, an operation in which various STAs transmit/receive a signal (e.g., a PPDU) may be performed in the transceivers (113, 123) of FIG. 1. In addition, in the following example, an operation in which various STAs generate a TX/RX signal or perform data processing and computation in advance for the TX/RX signal may be performed in the processors (111, 121) of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories (112, 122) of FIG. 1.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs (200, 205) (hereinafter, referred to as BSS). The BSSs (200, 205) as a set of an AP and an STA such as an access point (AP) (225) and a station (STA1) (200-1) which are successfully synchronized to communicate with each other are not concepts indicating a specific region. The BSS (205) may include one or more STAs (205-1, 205-2) which may be joined to one AP (230).

The BSS may include at least one STA, APs providing a distribution service, and a distribution system (DS) (210) connecting multiple APs.

The distribution system (210) may implement an extended service set (ESS) (240) extended by connecting the multiple BSSs (200, 205). The ESS (240) may be used as a term indicating one network configured by connecting one or more APs through the distribution system (210). The AP included in one ESS (240) may have the same service set identification (SSID).

A portal (220) may serve as a bridge which connects the wireless LAN network (IEEE 802.11) and another network (e.g., 802.X).

In the BSS illustrated in the upper part of FIG. 2, a network between the APs (225, 230) and a network between the APs (225, 230) and the STAs (200-1, 205-1, 205-2) may be implemented. However, the network is configured even between the STAs without the APs (225, 230) to perform communication. A network in which the communication is performed by configuring the network even between the STAs without the APs (225, 230) is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs (250-1, 250-2, 250-3, 255-4, 255-5) are managed by a distributed manner. In the IBSS, all STAs (250-1, 250-2, 250-3, 255-4, 255-5) may be constituted by movable STAs and are not permitted to access the DS to constitute a self-contained network.

Figure 3:
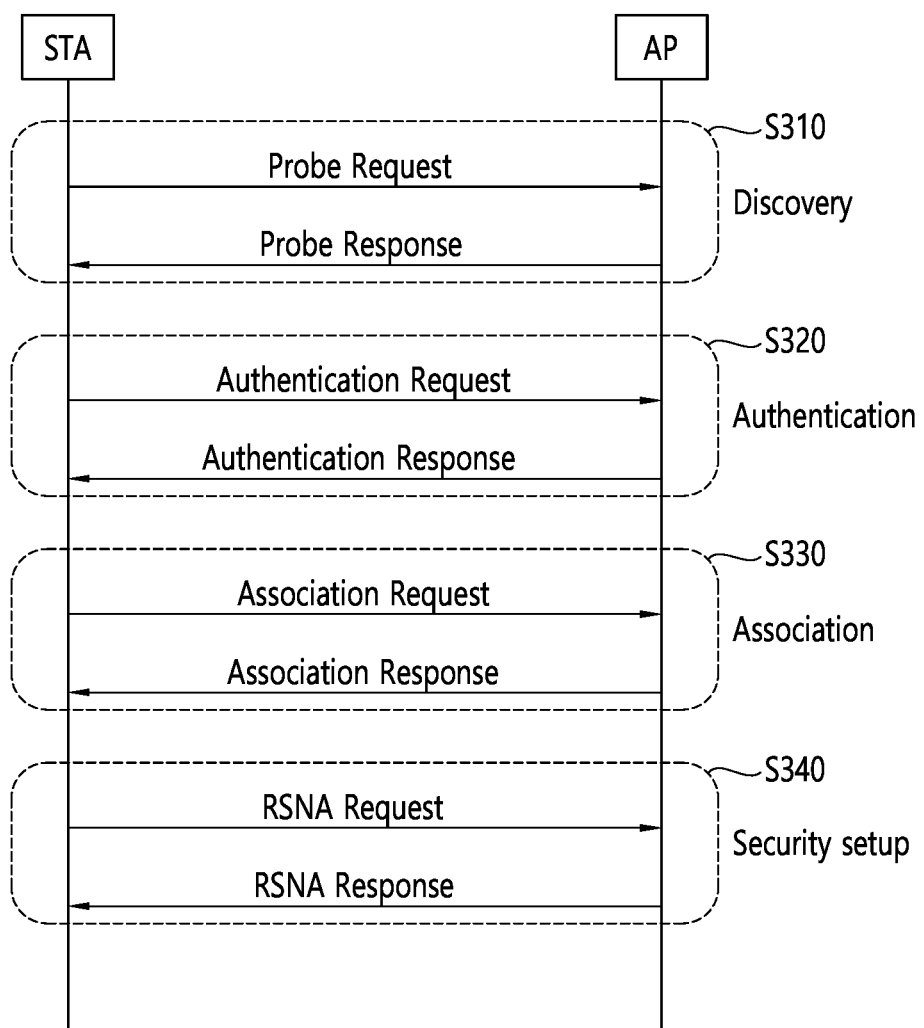
FIG. 3 illustrates a general link setup process.

FIG. 3 illustrates a general link setup process.

In step S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in step S320. The authentication process may be referred to as a first authentication process to be clearly distinguished from the following security setup operation in step S340. The authentication process in step S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in step S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In step S340, the STA may perform a security setup process. The security setup process in step S340 may include a process of setting up a private key through four-way handshaking, for example, through an extensible authentication protocol over LAN (EAPOL) frame.

FIG. 4 illustrates an example of a PPDU used in an IEEE standard.

As illustrated in FIG. 4, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. A HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
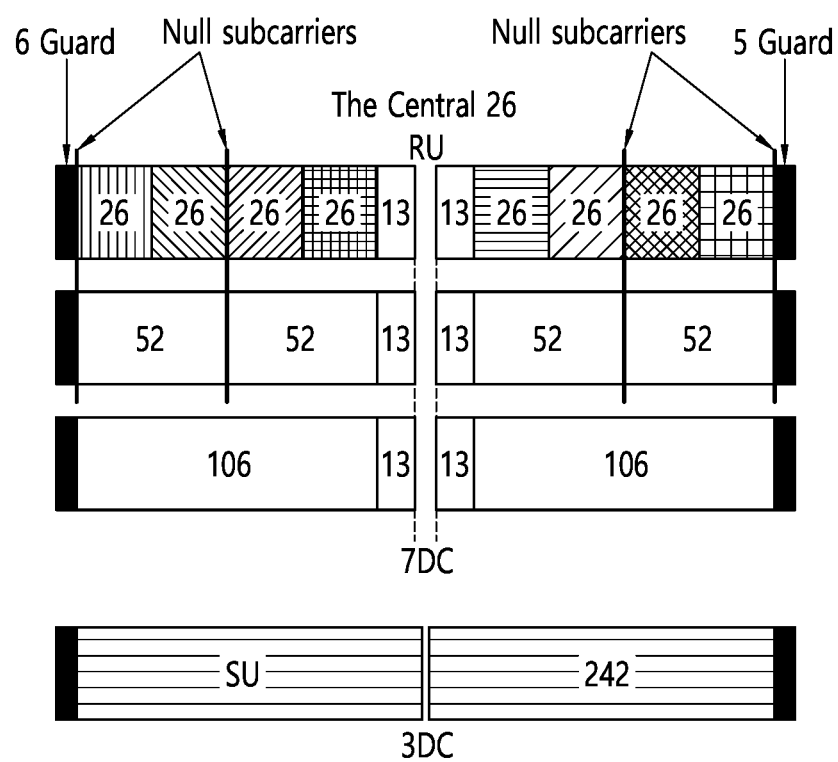
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for a HE-STF, a HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple-user (MU) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
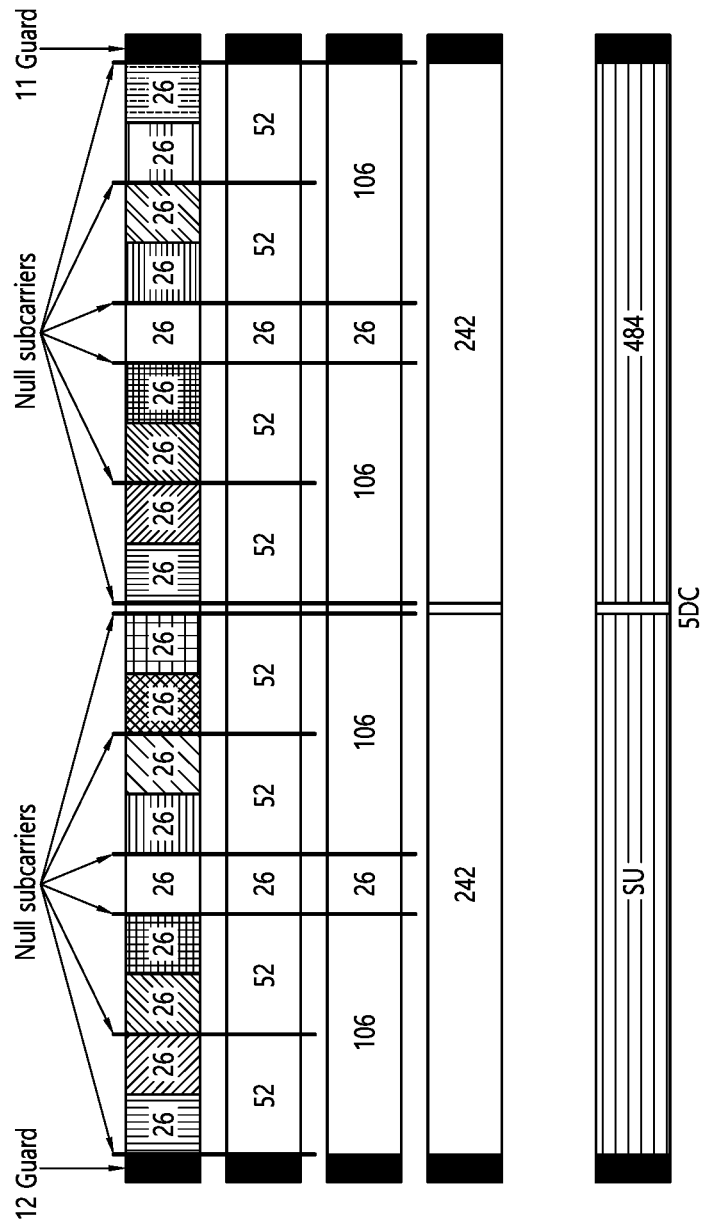
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
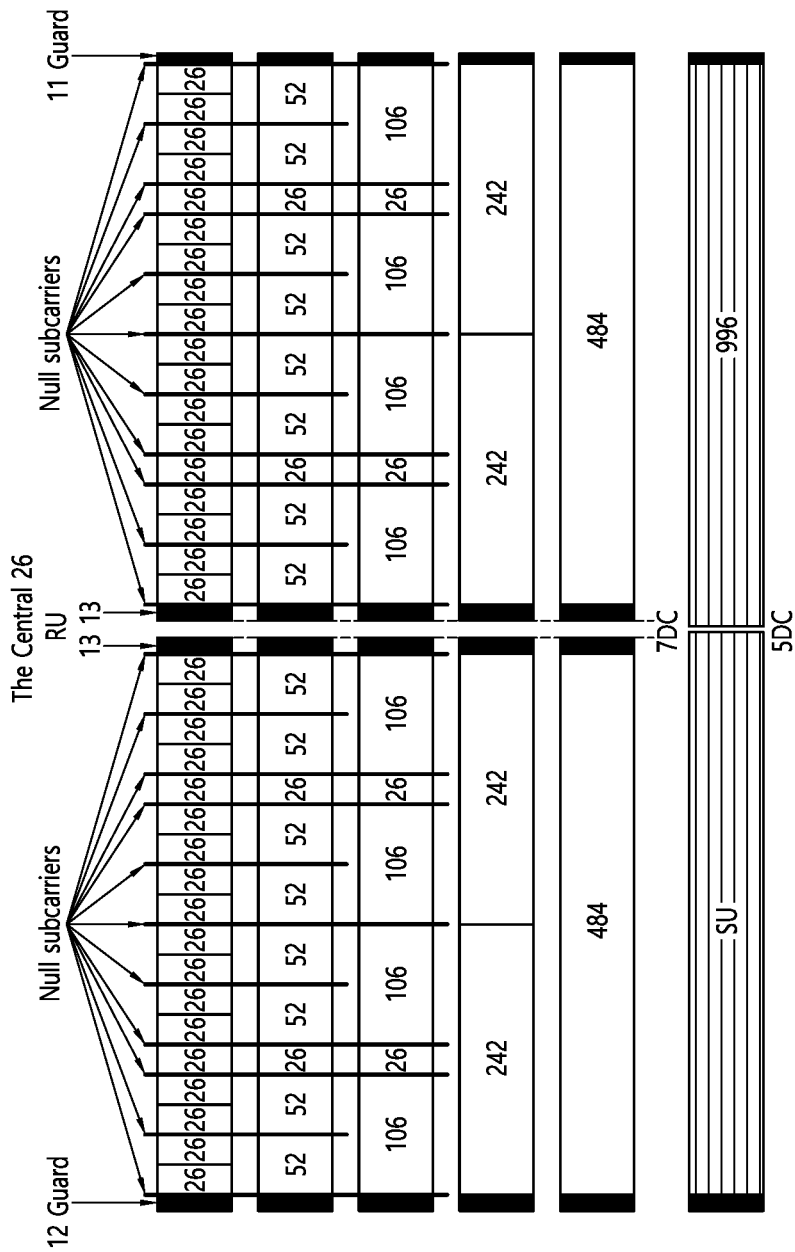
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as the examples of FIGS. 5 and 6.

The RU arrangement/allocation (i.e., RU location) shown in FIGS. 5 to 7 can be applied to a new wireless LAN system (e.g., EHT system) as it is. Meanwhile, in the 160 MHz band supported by the new WLAN system, the RU arrangement/allocation for 80 MHz (that is, the example of FIG. 7) is repeated twice, or the RU arrangement for the 40 MHz (i.e., the example of FIG. 6) is repeated 4 times. In addition, when the EHT PPDU is configured in the 320 MHz band, the arrangement/allocation of the RU for 80 MHz (i.e., example of FIG. 7) may be repeated 4 times or the arrangement of the RU for 40 MHz (i.e., example of FIG. 6) may be repeated 8 times.

One RU of the present specification may be allocated for only one STA (e.g., non-AP). Alternatively, a plurality of RUs may be allocated for one STA (e.g., non-AP).

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, and so on) to a first STA through the trigger frame, and may allocate a second RU (e.g., 26/52/106/242-RU, and so on) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, and so on) to the first STA, and may allocate the second RU (e.g., 26/52/106/242-RU, and so on) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
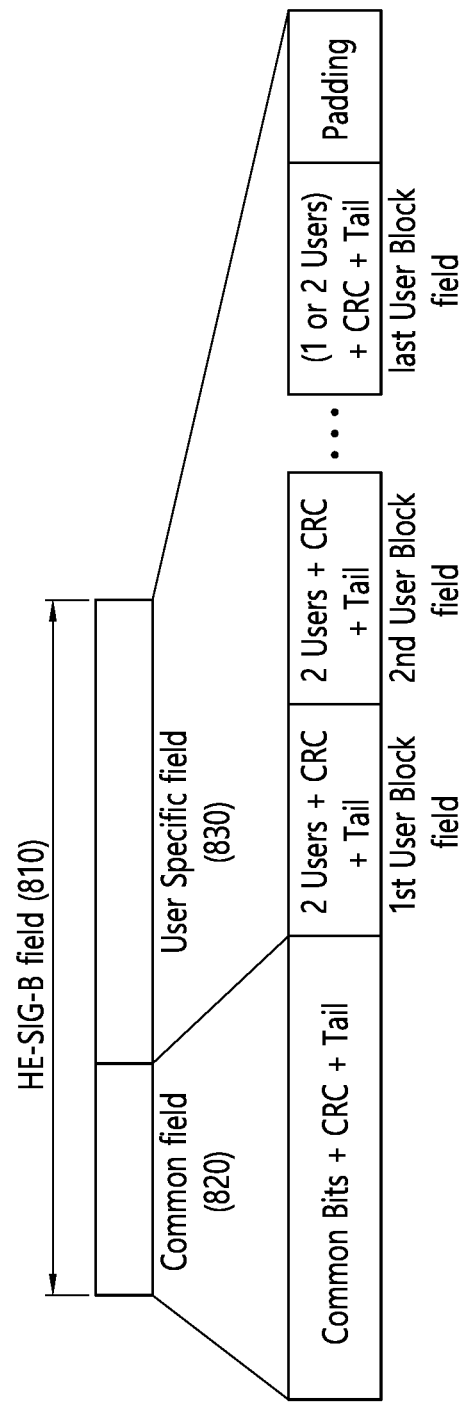
FIG. 8 illustrates a structure of an HE-SIG-B field.

FIG. 8 illustrates a structure of an HE-SIG-B field.

As illustrated, a HE-SIG-B field (810) includes a common field (820) and a user-specific field (830). The common field (820) may include information commonly applied to all users (i.e., user STAs) which receive SIG-B. The user-specific field (830) may be called a user-specific control field. When the SIG-B is transferred to a plurality of users, the user-specific field (830) may be applied only any one of the plurality of users.

As illustrated in FIG. 8, the common field (820) and the user-specific field (830) may be separately encoded.

The common field (820) may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field (820) is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field (830) may include a plurality of user fields. As described above, the number of STAs (e.g., user STAs) allocated to a specific channel may be determined based on the RU allocation information of the common field (820). For example, when the RU allocation information of the common field (820) is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
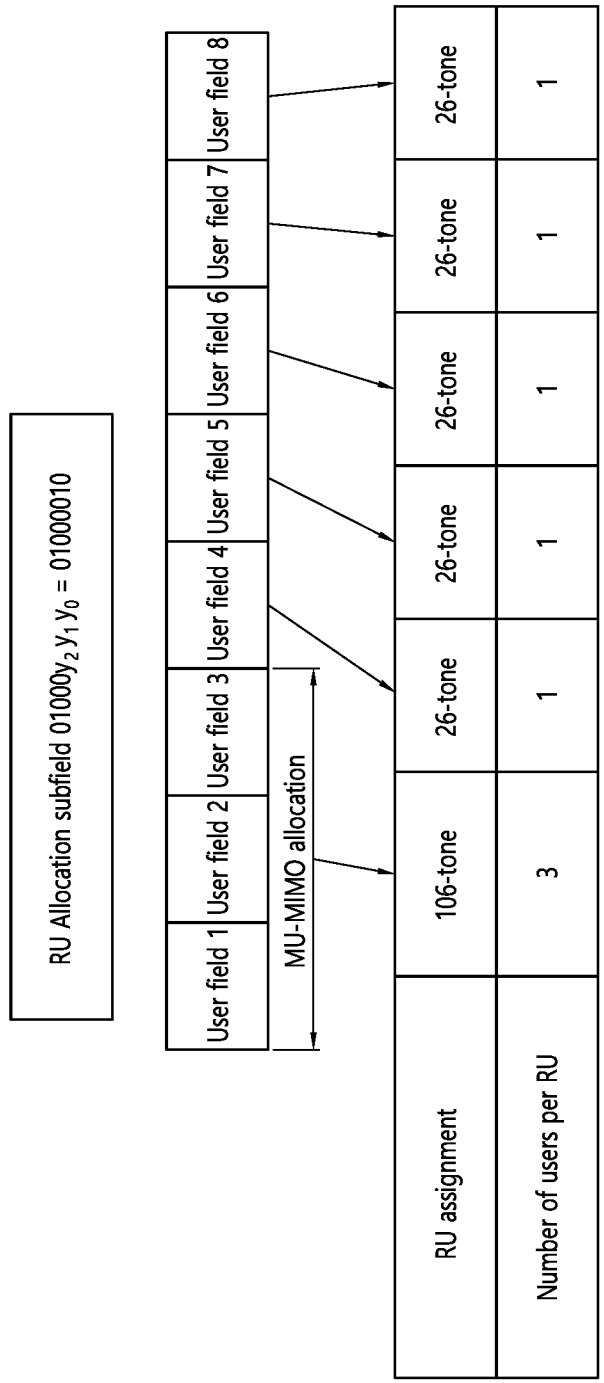
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field (830) of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, and so on) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a values of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, and so on) and information related to a coding rate (e.g., ½, ⅔, ¾, ⅚e, and so on). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
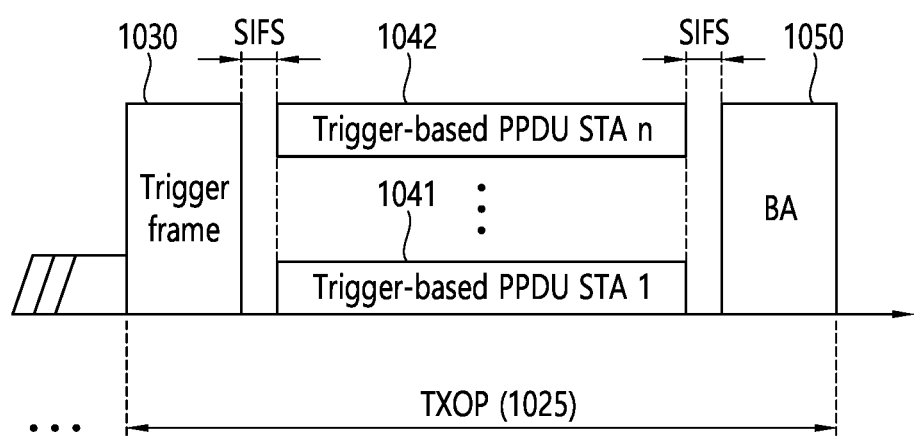
FIG. 10 illustrates an operation based on UL-MU.

FIG. 10 illustrates an operation based on UL-MU. As illustrated, a transmitting STA (e.g., AP) may perform channel access through contending (e.g., a backoff operation), and may transmit a trigger frame (1030). That is, the transmitting STA may transmit a PPDU including the trigger frame (1030). Upon receiving the PPDU including the trigger frame, a trigger-based (TB) PPDU is transmitted after a delay corresponding to SIFS.

TB PPDUs (1041, 1042) may be transmitted at the same time period, and may be transmitted from a plurality of STAs (e.g., user STAs) having AIDs indicated in the trigger frame (1030). An ACK frame (1050) for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
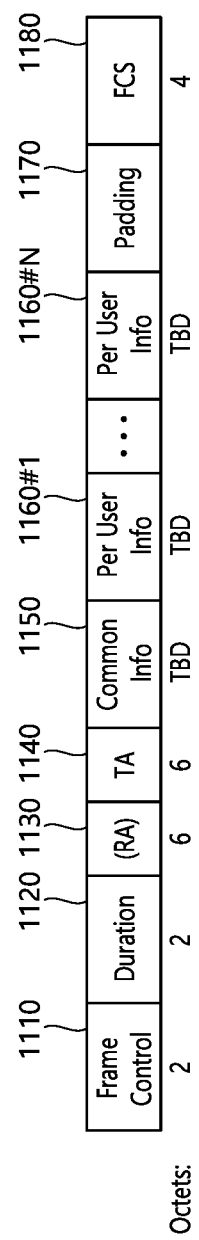
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the drawing.

A frame control field (1110) of FIG. 11 may include information related to a MAC protocol version and extra additional control information. A duration field (1120) may include time information for NAV configuration or information related to an identifier (e.g., AID) of an STA.

In addition, an RA field (1130) may include address information of a receiving STA of a corresponding trigger frame, and may be optionally omitted. A TA field (1140) may include address information of an STA (e.g., AP) which transmits the corresponding trigger frame. A common information field (1150) includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields (1160 #1 to 1160 #N) corresponding to the number of receiving STAs which receive the trigger frame of FIG. 11 are preferably included. The per user information field may also be called an "allocation field".

In addition, the trigger frame of FIG. 11 may include a padding field (1170) and a frame check sequence field (1180).

Each of the per user information fields (1160 #1 to 1160 #N) shown in FIG. 11 may include a plurality of subfields.

Figure 12:
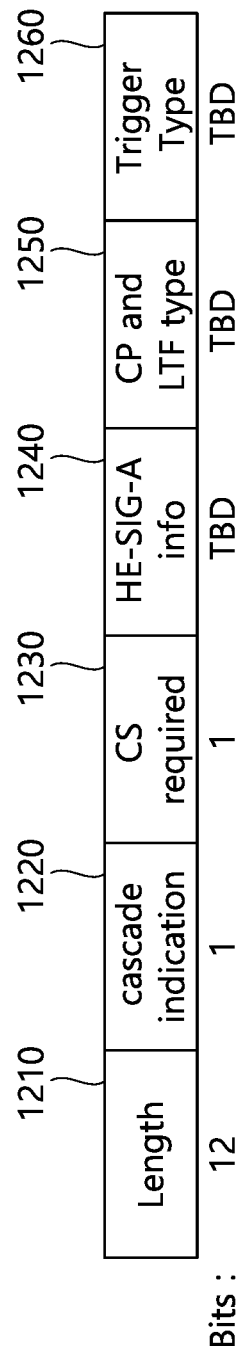
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field (1210) illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field (1210) of the trigger frame may be used to indicate the length of the corresponding uplink PPDU.

In addition, a cascade identifier field (1220) indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field (1230) indicates whether a wireless medium state or an NAV or the like is necessarily considered in a situation where a receiving device which has received a corresponding trigger frame transmits a corresponding uplink PPDU.

A HE-SIG-A information field (1240) may include information for controlling content of an SIG-A field (i.e., HE-SIG-A field) of the uplink PPDU in response to the corresponding trigger frame.

A CP and LTF type field (1250) may include information related to a CP length and LTF length of the uplink PPDU transmitted in response to the corresponding trigger frame. A trigger type field (1260) may indicate a purpose of using the corresponding trigger frame, for example, typical triggering, triggering for beamforming, a request for block ACK/NACK, or the like.

It may be assumed that the trigger type field (1260) of the trigger frame in the present specification indicates a trigger frame of a basic type for typical triggering. For example, the trigger frame of the basic type may be referred to as a basic trigger frame.

Figure 13:
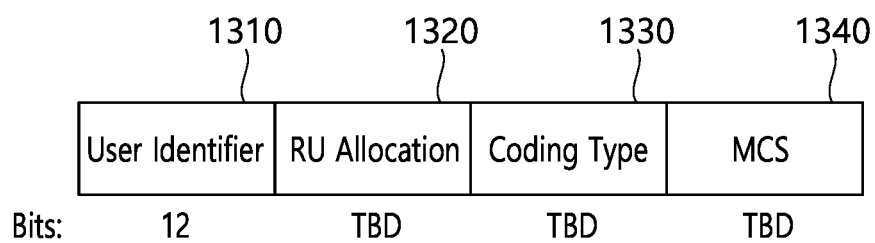
FIG. 13 illustrates an example of a subfield included in a per user information field.

FIG. 13 illustrates an example of a subfield included in a per user information field. A user information field (1300) of FIG. 13 may be understood as any one of the per user information fields (1160 #1 to 1160 #N) mentioned above with reference to FIG. 11. A subfield included in the user information field (1300) of FIG. 13 may be partially omitted, and an extra subfield may be added. In addition, a length of each subfield illustrated may be changed.

A user identifier field (1310) of FIG. 13 indicates an identifier of an STA (i.e., receiving STA) corresponding to per user information. An example of the identifier may be the entirety or part of an association identifier (AID) value of the receiving STA.

In addition, an RU allocation field (1320) may be included. That is, when the receiving STA identified through the user identifier field (1310) transmits a TB PPDU in response to the trigger frame, the TB PPDU is transmitted through an RU indicated by the RU allocation field (1320). In this case, the RU indicated by the RU allocation field (1320) may be an RU shown in FIG. 5, FIG. 6, and FIG. 7.

The subfield of FIG. 13 may include a coding type field (1330). The coding type field (1330) may indicate a coding type of the TB PPDU. For example, when BCC coding is applied to the TB PPDU, the coding type field (1330) may be set to '1', and when LDPC coding is applied, the coding type field (1330) may be set to '0'.

In addition, the subfield of FIG. 13 may include an MCS field (1340). The MCS field (1340) may indicate an MCS scheme applied to the TB PPDU. For example, when BCC coding is applied to the TB PPDU, the coding type field (1330) may be set to '1', and when LDPC coding is applied, the coding type field (1330) may be set to '0'.

Hereinafter, a UL OFDMA-based random access (UORA) scheme will be described.

Figure 14:
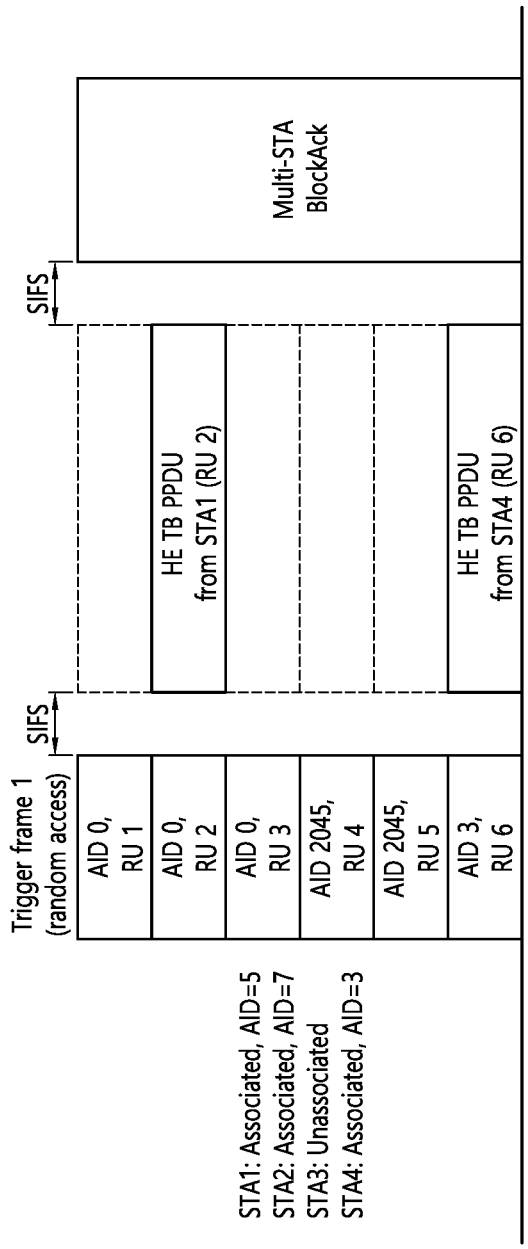
FIG. 14 describes a technical feature of the UORA scheme.

FIG. 14 describes a technical feature of the UORA scheme.

A transmitting STA (e.g., AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field (1310) of FIG. 13. Information related to the RU 1 to RU 6 may be included, for example, in the RU allocation field (1320) of FIG. 13. AID=0 may imply a UORA resource for an associated STA, and AID=2045 may imply a UORA resource for a non-associated STA. Accordingly, the 1st to 3rd RU resources of FIG. 14 may be used as a UORA resource for the associated STA, the 4th and 5th RU resources of FIG. 14 may be used as a UORA resource for the non-associated STA, and the 6th RU resource of FIG. 14 may be used as a typical resource for UL MU.

In the example of FIG. 14, an OFDMA random access backoff (OBO) of an STA1 is decreased to 0, and the STA1 randomly selects the 2nd RU resource (AID 0, RU 2). In addition, since an OBO counter of an STA2/3 is greater than 0, an uplink resource is not allocated to the STA2/3. In addition, regarding an STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is a non-associated STA, the total number of eligible RA RUs for the STA3 is 2 (RU 4, RU 5), and thus the STA3 decreases the OBO counter by 2 but the OBO counter is greater than 0.

Figure 15:
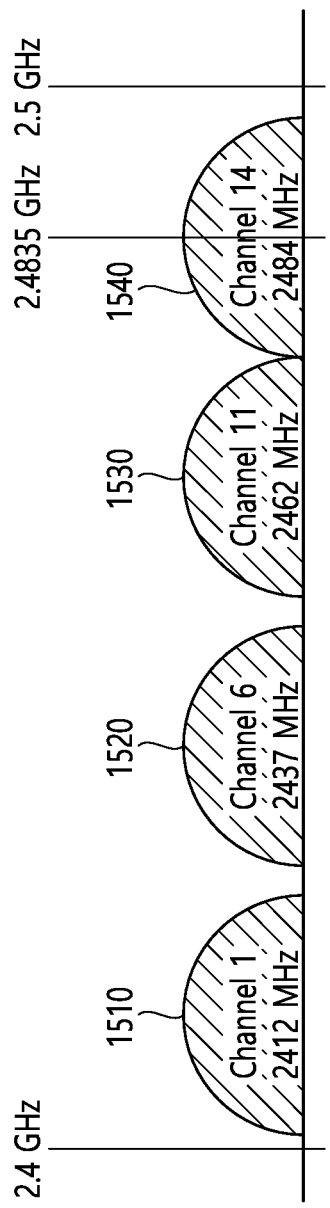
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be $(2.407+0.005*N)$ GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains (1510 to 1540) shown herein may include one channel. For example, the 1st frequency domain (1510) may include a channel 1 (a 20 MHz channel having an index 1). In this case, a center frequency of the channel 1 may be set to 2412 MHz. The 2nd frequency domain (1520) may include a channel 6. In this case, a center frequency of the channel 6 may be set to 2437 MHz. The 3rd frequency domain (1530) may include a channel 11. In this case, a center frequency of the channel 11 may be set to 2462 MHz. The 4th frequency domain (1540) may include a channel 14. In this case, a center frequency of the channel 14 may be set to 2484 MHz.

Figure 16:
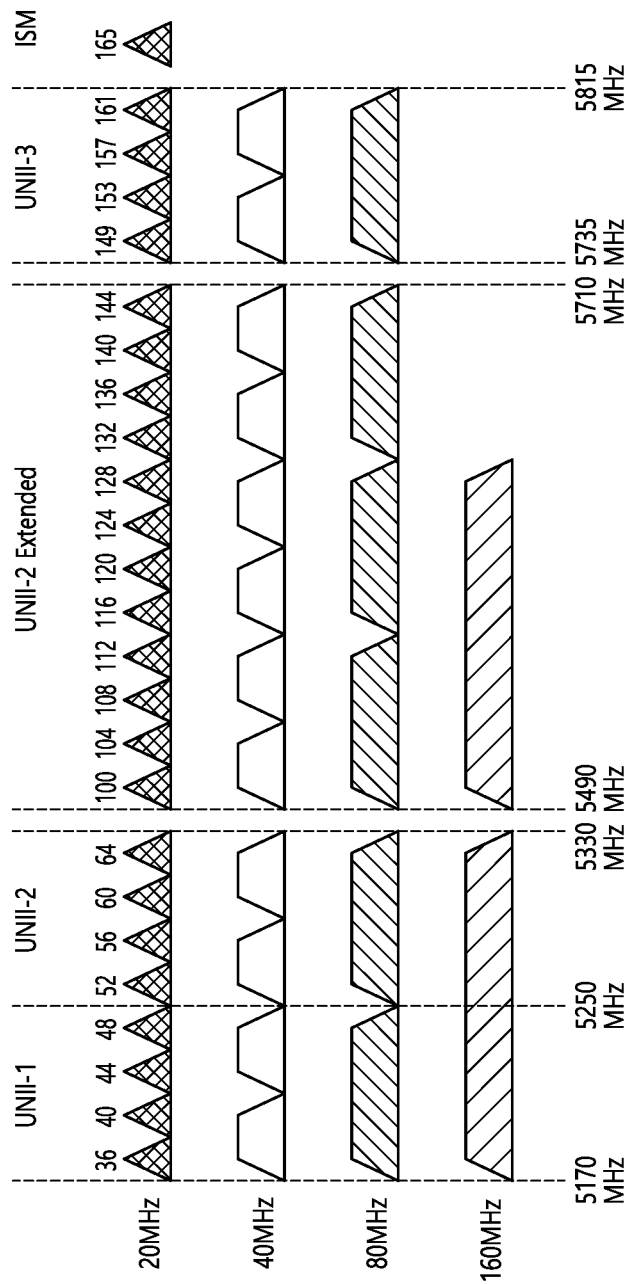
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
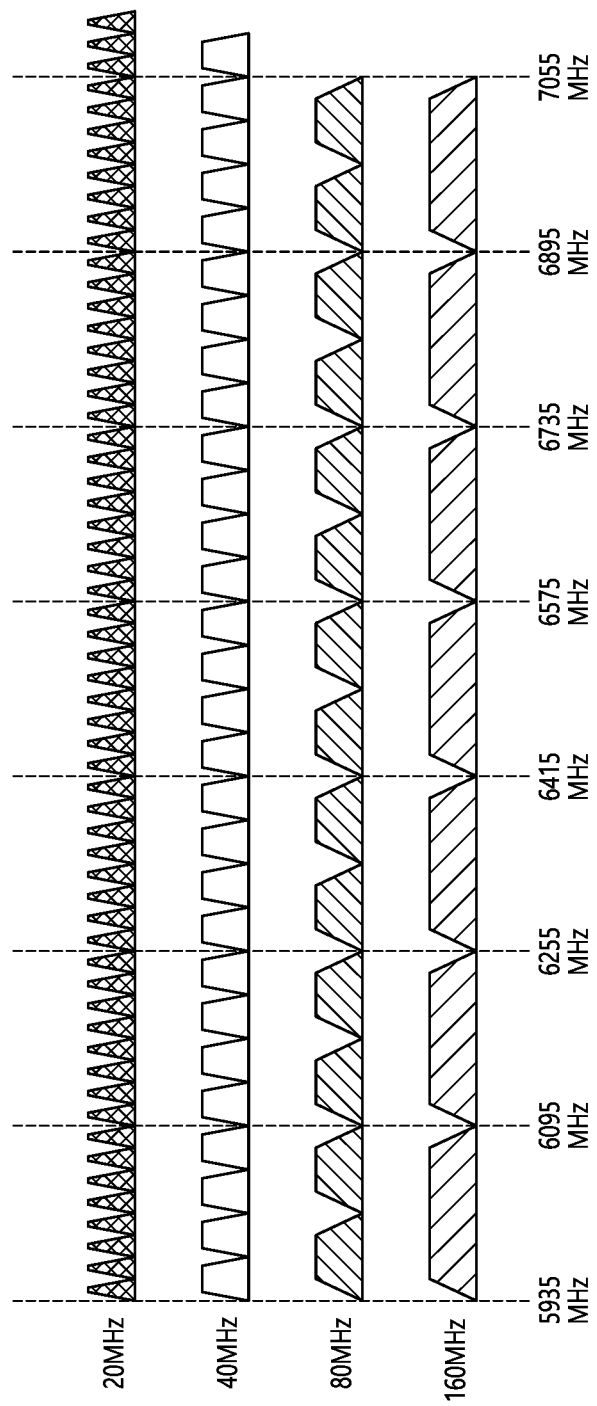
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, and so on), and 5.945 GHz may be assigned as a center frequency. That is, a center frequency of a channel of an index N may be determined as $(5.940+0.005*N)$ GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned $(5.940+0.005*N)$ GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in an STA of the present specification will be described.

FIG. 18 illustrates an example of a PPDU being used in the present specification.

The PPDU of FIG. 18 may be referred to as various terms, such as EHT PPDU, transmitting PPDU, receiving PPDU, first type or $N^{th}$ type PPDU, and so on. Additionally, the PPDU of FIG. 18 may be used in an EHT system and/or a new WLAN system, which is an enhanced version of the EHT system.

Subfields of FIG. 18 may be changed to various terms. For example, an SIG A field may be referred to as an EHT-SIG-A field, an SIG B field may be referred to as an EHT-SIG-B field, and STF field may be referred to as an EHT-STF field, an LTF field may be referred to as an EHT-LTF field, and so on.

Subcarrier spacing of the L-LTF, L-STF, L-SIG, and RL-SIG fields of FIG. 18 may be determined as 312.5 kHz, and subcarrier spacing of the STF, LTF, Data fields may be determined as 78.125 kHz. That is, subcarrier indexes of the L-LTF, L-STF, L-SIG, and RL-SIG fields may be indicated in 312.5 kHz units, and subcarrier indexes of the STF, LTF, and Data fields may be indicated in 78.125 kHz units.

The SIG A field and/or SIG B field of FIG. 18 may include additional fields (e.g., SIG C or one control symbol, and so on). In the SIG A field and SIG B field, all/part of the subcarrier spacing may be determined as 312.5 kHz, and the remaining part of the subcarrier spacing may be determined as 78.125 kHz.

In the PPDU of FIG. 18, L-LTF and L-STF may be the same as the fields of the related art.

The L-SIG field of FIG. 18 may, for example, include 24 bits of bit information. For example, the 24-bit information may include a 4-bit Rate field, 1 Reserved bit, a 12-bit Length field, 1 Parity bit, and 6 Tail bits. For example, the 12-bit Length field may include information related to a number of octets in a Physical Service Data Unit (PSDU). For example, a value of the 12-bit Length field may be determined based on a type of the PPDU. For example, in case the PPDU is a non-HT PPDU, an HT PPDU, a VHT PPDU, or an EHT PPDU, the value of the Length field may be determined as a multiple of 3. For example, in case the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

For example, a transmitting STA may apply BCC encoding, which is based on a ½-code rate for 24-bit information of the L-SIG field. Afterwards, the transmitting STA may obtain 48 bits of BCC encoding bits. Then, BPSK modulation may be applied to the 48 encoding bits so as to generate 48 BPSK symbols. The transmitting STA may map the 48 BPSK symbols to positions excluding a pilot subcarrier{Subcarrier indexes −21, −7, +7, +21} and a DC subcarrier{Subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to subcarrier indexes {−28, −27, +27, +28}. The aforementioned signal may be used for channel estimation for a frequency domain corresponding to {−28, −27, +27, +28}.

The transmitting STA may generate an RL-SIG, which is generated identically as the L-SIG. The receiving STA may know that the reception PPDU is an HE PPDU or EHT PPDU based on the presence (or existence) of an RL-SIG.

After the RL-SIG of FIG. 18, for example, an EHT-SIG-A or one control symbol may be inserted. A symbol (i.e., EHT-SIG-A or one control symbol) that is contiguous to RL-SIG may include 26-bit information and may include information for identifying an EHT PPDU type. For example, in case the EHT PPDU is sorted to various types (e.g., various types, such as EHT PPDU supporting SU, EHT PPDU supporting MU, EHT PPDU related to a Trigger Frame, EHT PPDU related to Extended Range transmission, and so on), information on the EHT PPDU type may be included in a symbol that is contiguous to the RL-SIG.

A symbol that is contiguous to the RL-SIG, for example, may include information on a TXOP length, and information on a BSS color ID. For example, an SIG-A field may be configured so as to be contiguous to the symbol (e.g., one control symbol) that is contiguous to the RL-SIG. Alternatively, a symbol that is contiguous to the RL-SIG may be an SIG-A field.

For example, the SIG-A field may include information on 1) a DL/UL indicator, 2) a BSS color field, which is an identifier of the BSS, 3) a field including information related to remaining time of a current TXOP duration, 4) a bandwidth field including information related to bandwidth, 5) a field including information related to MCS being applied to SIG-B, 6) an indication field including information related to whether or not a dual subcarrier modulation scheme is being applied to SIG-B, 7) a field including information related to a number of symbols being used for SIG-B, 8) a field including information related to whether or not SIG-B is generated throughout the full bandwidth, 9) a field including information related to an LTF/STF type, and 10) a field indicating LTF length and CP length.

The SIG-B of FIG. 18 may directly include the technical features of the HE-SIG-B indicated in FIG. 8 to FIG. 9 without modification.

STF of FIG. 18 may be used for enhancing automatic gain control estimation in a multiple input multiple output (MIMO) environment or OFDMA environment. And, LTF of FIG. 18 may be used for estimating a channel in a MIMO environment or OFDMA environment.

The STF of FIG. 18 may be configured as various types STF. For example, among the STFs, a first type (i.e., 1×STF) may be generated based on a first type STF sequence, wherein non-zero coefficients are positioned at 16 subcarrier spacings. An STF signal that is generated based on the first type STF sequence may have a cycle of 0.8 µs. And, a 0.8 µs-cycle signal is repeated 5 times so as to configure a first type STF having a length of 4 µs. For example, among the STFs, a second type (i.e., 2×STF) may be generated based on a second STF sequence, wherein non-zero coefficients are positioned at 8 subcarrier spacings. An STF signal that is generated based on the second type STF sequence may have a cycle of 1.6 µs. And, a 1.6 µs-cycle signal is repeated 5 times so as to configure a first type STF having a length of 8 µs. For example, among the STFs, a third type (i.e., 4×STF) may be generated based on a third STF sequence, wherein non-zero coefficients are positioned at 4 subcarrier spacings. An STF signal that is generated based on the third type STF sequence may have a cycle of 3.2 µs. And, a 3.2 µs-cycle signal is repeated 5 times so as to configure a first type STF having a length of 16 µs. Among the above-described first to third type EHT-STF sequences, only part may be used. Additionally, an EHT-LTF field may have first, second, and third types (i.e., 1×, 2×, 4×LTF). For example, first/second/third type LTF field may be generated based on an LTF sequence having non-zero coefficients positioned at 4/2/1 subcarrier spacings. The first/second/third type LTF may respectively have a time length of 3.2/6.4/12.8 µs. Additionally, various lengths of GI (e.g., 0.8/1/6/3.2 µs) may be applied to the first/second/third type LTF.

Information related to the STF and/or LTF type (also including information related to GI being applied to LTF) may be included in the SIG A field and/or SIG B field, and so on, of FIG. 18.

The PPDU of FIG. 18 may support various bandwidths. For example, the PPDU of FIG. 18 may have bandwidths of 20/40/80/160/240/320 MHz. For example, part of the fields of FIG. 18 (e.g., STF, LTF, or Data) may be configured based on the RU, which is shown in FIG. 5 to FIG. 7, and so on. For example, in case there is one receiving STA of the PPDU of FIG. 18, all fields of the PPDU of FIG. 18 may occupy the whole bandwidth. For example, in case there are multiple receiving STA of the PPDU of FIG. 18 (in case MU PPDU is used), part of the fields of FIG. 18 (e.g., STF, LTF, or Data) may be configured based on the RU, which is shown in FIG. 5 to FIG. 7, and so on. For example, STF, LTF, and Data field for a first receiving STA of the PPDU may be transmitted and received through a first RU, and STF, LTF, and Data field for a second receiving STA of the PPDU may be transmitted and received through a second RU. In this case, positions of the first/second RUs may be determined based on FIG. 5 to FIG. 7, and so on.

The PPDU of FIG. 18 may be determined (or identified) as an EHT PPDU based on the following method.

A receiving STA may determine the type of a reception PPDU as an EHT PPDU based on the following. For example, the reception PPDU may be determined as an EHT PPDU, 1) in case a first symbol following an L-LTF signal of the reception PPDU is BPSK, 2) in case an RL-SIG having the L-SIG of the reception PPDU is repeated therein is detected, and 3) in case a result of applying "modulo 3" for a Length value of the L-SIG of the reception PPDU is detected as "0". In case the reception PPDU is determined as an EHT PPDU, the receiving STA may detect the type of the EHT PPDU (e.g., SU/MU/Trigger-based/Extended Range type) based on the bit information being included in a symbol that follows the RL-SIG of FIG. 18. In other words, the receiving STA may determine the reception PPDU as an EHT PPDU based on 1) a first symbol following the L-LTF signal, wherein the first symbol is BPSK, 2) an RL-SIG being contiguous to the L-SIG field and being identical to the L-SIG, and 3) an L-SIG including a Length field having the result of applying "modulo 3" set to "0".

For example, the receiving STA may determine the type of a reception PPDU as an HE PPDU based on the following. For example, the reception PPDU may be determined as an HE PPDU, 1) in case a first symbol following an L-LTF signal is BPSK, 2) in case an RL-SIG having the L-SIG is repeated therein is detected, and 3) in case a result of applying "modulo 3" for a Length value of the L-SIG is detected as "1" or "2".

For example, the receiving STA may determine the type of a reception PPDU as non-HT, HT, and VHT PPDU based on the following. For example, the reception PPDU may be determined as non-HT, HT, and VHT PPDU, 1) in case a first symbol following an L-LTF signal is BPSK, 2) in case an RL-SIG having the L-SIG is repeated therein is not detected, and 3) in case a result of applying "modulo 3" for a Length value of the L-SIG is detected as "0".

In the following example, a signal being indicated as a (transmission/reception) signal, a (transmission/reception) frame, a (transmission/reception) packet, a (transmission/reception) data unit, (transmission/reception) data, and so on, may be a signal being transmitted/received based on the PPDU of FIG. 18. The PPDU of FIG. 18 may be used for transmitting/receiving various types of frames. For example, the PPDU of FIG. 18 may be used for a control frame. Examples of the control frame may include request to send (RTS), clear to send (CTS), Power Save-Poll (PS-Poll), BlockACKReq, BlockAck, Null Data Packet (NDP) announcement, and Trigger frames. For example, the PPDU of FIG. 18 may be used for a management frame. Examples of the management frame may include a Beacon frame, a/an (Re-)Association Request frame, a/an (Re-)Association Response frame, a Probe Request frame, and a Probe Response frame. For example, the PPDU of FIG. 18 may be used for a data frame. For example, the PPDU of FIG. 18 may be used for simultaneously transmitting at least two or more of the control frame, the management frame, and the data frame.

Figure 19:
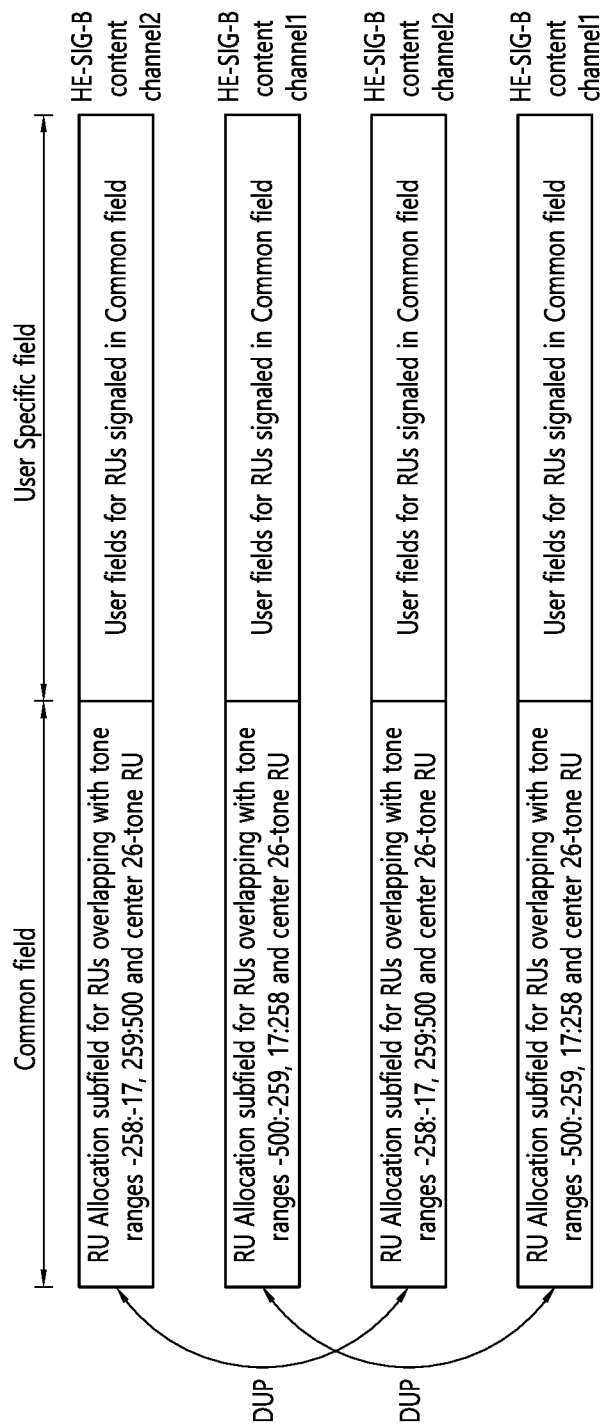
FIG. 19 illustrates an example of an HE-SIG-B content channel being configured at 80 MHz.

FIG. 19 illustrates an example of an HE-SIG-B content channel being configured at 80 MHz.

Referring to FIG. 19, an example of the present specification may propose an example of independently configuring lower two 20 MHz channels and higher two 20 MHz channels. More specifically, proposed herein may be an example of configuring a HE-SIG-B corresponding to the higher or lower two 20 MHz channels and duplicating the HE-SIG-B so as to use the duplicated for the remaining two 20 MHz channels.

In case the four 20 MHz channels shown in the example of FIG. 19 are sorted as a first channel to a fourth channel starting from the lowest channel, the second channel and the fourth channel may be referred to as HE-SIG-B content channel 1. Additionally, the first channel and the third channel may be referred to as HE-SIG-B content channel 2. Contents of the HE-SIG-B included in the first channel may be the same as contents of the HE-SIG-B included in the third channel. And, contents of the HE-SIG-B included in the second channel may be the same as contents of the HE-SIG-B included in the fourth channel. In other words, contents of the SIG-B included in the first and second channels may be the same as contents of the SIG-B included in the third and fourth channels.

Hereinafter, in the present specification, exemplary embodiments of configuring an SIG-B content channel may be described.

A Beyond 11ax standard (e.g., 802.11be standard (i.e., EHT standard)) may transmit a signal by using a wide bandwidth (e.g., 240/320 MHz). In case of transmitting a signal by using a wide bandwidth, a user control field (e.g., User field), which is configured for transmitting information on STA, may be configured by various methods and may, then, be transmitted. Therefore, a method of configuring a user control field may hereinafter be described.

In an embodiment of the present specification, the receiving STA may receive a Physical layer Protocol Data Unit (PPDU) including a control information field, a plurality of Signal field, and a plurality of Data fields. The control information field may include control information interpreting the PPDU. One control information field may have a first bandwidth. For example, a first bandwidth may be configured as one of 20, 40, 80, 160, 240, or 320 MHz.

The control information field within the PPDU may be duplicated based on the first bandwidth. The control information field may include an SIG-A field. More specifically, the control information field may be duplicated on units of the first bandwidth. For example, the PPDU may be transmitted through 240 MHz, and the first bandwidth may be configured as 20 MHz. At this point, the control information field of the PPDU may be duplicated on 20 MHz units.

The plurality of Signal fields may include a first Signal field and a second Signal field. The plurality of Signal fields may include an SIG-B field. Each of the first Signal field and the second Signal field may have a second bandwidth. For example, a second bandwidth may be configured as one of 20, 40, 80, 160, 240, or 320 MHz. Each of the first Signal field and the second Signal field may be duplicated based on the second bandwidth. The second bandwidth may be configured to be wider than the first bandwidth. For example, the PPDU may be transmitted through 240 MHz, and the first bandwidth may be configured as 20 MHz, and the second bandwidth may be configured as 40 MHz. The first Signal field may be duplicated on 40 MHz units. The second Signal field may be duplicated on 40 MHz units.

The plurality of Data fields may include a plurality of odd-numbered data fields being received through a plurality of odd-numbered data subchannels and a plurality of even-numbered data fields being received through a plurality of even-numbered data subchannels. The bandwidth of the plurality of odd-numbered data subchannels may be configured to be identical as or different from the bandwidth through which the first Signal field is received. And, the bandwidth of the plurality of even-numbered data subchannels may be configured to be identical as or different from the bandwidth through which the second Signal field is received.

The receiving STA may decode at least one of the plurality of Data fields based on at least one of the first Signal field and the second Signal field. More specifically, the first Signal field may be used for decoding the plurality of odd-numbered data fields. And, the second Signal field may be used for decoding the plurality of even-numbered data fields.

Hereinafter, the first Signal field may be referred to as SIGB 1. And, the second Signal field may be referred to as SIGB 2. Additionally, a channel through which the plurality of Signal fields are being received may be referred to as an SIGB content channel (or SIGB channel).

In the embodiments of the present specification, a user field including information related to the STA may be referred to as SIGB. An SIGB may be transmitted to another STA. In addition to SIGB, the user field may also be referred to by various other terms. For example, the user field may also be referred to SIG-B, a plurality of Signal fields, and so on.

An SIGB for wide bandwidth transmission may be variously configured. Detailed configurations of the SIGB may hereinafter be described.

1. First Embodiment—Method for Transmitting an SIGB, after Newly Configuring an SIGB for 240 or 320 MHz A. A SIGB for 20, 40, 80, or 160 MHz may be configured in 20 MHz units just as the conventional (or existing) 802.11ax standard. The SIGB may be transmitted by using two SIGB Content Channels.

B. In case of transmitting a signal through 240 or 320 MHz, in order to reduce overhead, the SIGB may be configured in 40 MHz or 80 MHz channel units.

B-i) In case the SIGB is configured in 40 MHz units (or channel units)

In case an SIGB including User information is configured in 40 MHz units, an SIGB Content Channel for 240 MHz or 320 MHz transmission may be variously configured.

B-i)-a In case two SIGB Content Channels (or SIGB channels) are configured

An SIGB may be independently configured in 40 MHz units at 80 MHz. Additionally, the SIGB may be duplicated on 80 MHz units. For example, when performing SIGB transmission (or when performing PPDU transmission) through 240 MHz, the SIGB may be configured as [1 2 1 2 1 2] and then transmitted. When performing transmission at 320 MHz, the SIGB may be configured as [1 2 1 2 1 2 1 2] and then transmitted. That is, the SIGB may be configured by using a method of repeating SIGB 1 and SIGB 2.

For example, when performing transmission at 240 MHz, the SIGB Content Channel 1 may be configured to include information on an STA being allocated to first, third, and/or fifth 40 MHz channels within 240 MHz. And, the SIGB Content Channel 2 may be configured to include information on an STA being allocated to second, fourth, and/or sixth 40 MHz channels.

Figure 20:
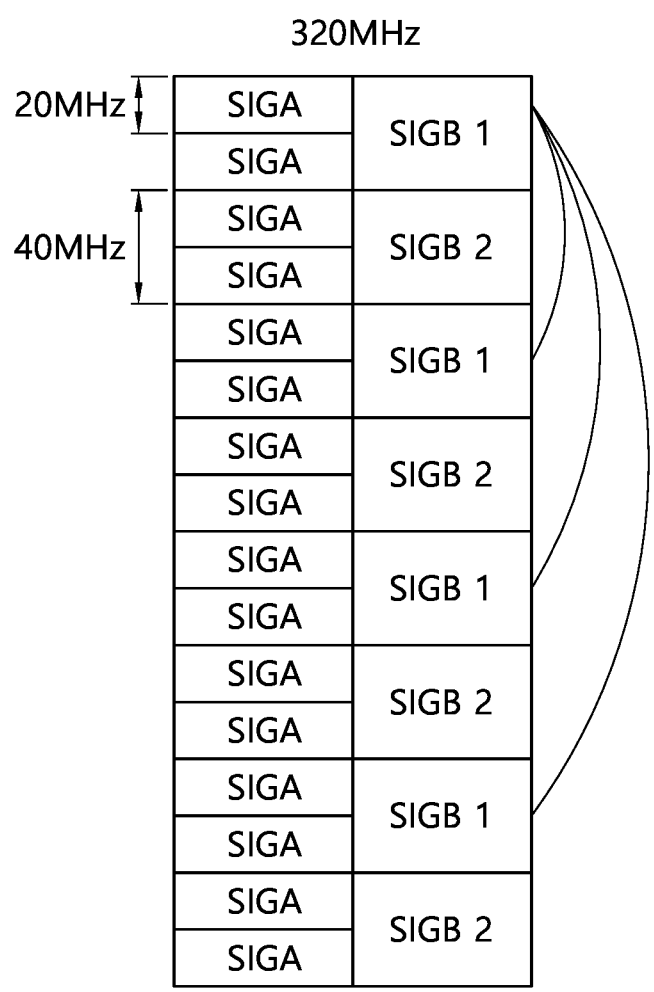
FIG. 20 illustrates an SIGB content channel configuration when performing PPDU transmission through 320 MHz.

As another example, when performing SIGB transmission at 320 MHz, the SIGB Content Channel 1 may be configured to include information on an STA being allocated to first, third, fifth, and/or seventh 40 MHz channels within 320 MHz. And, the SIGB Content Channel 2 may be configured to include information on an STA being allocated to second, fourth, sixth, and/or eighth 40 MHz channels. FIG. 20 is a drawing for describing the aforementioned example.

FIG. 20 illustrates an SIGB content channel configuration when performing PPDU transmission through 320 MHz.

Referring to FIG. 20, SIGA may be duplicated on 20 MHz units and may then be transmitted through 320 MHz. SIGB may be duplicated on 40 MHz units and may then be transmitted through 320 MHz. SIGB may be transmitted through two SIGB content channels. More specifically, SIGB 1 may be transmitted through first, third, fifth, and seventh 40 MHz channels within 320 MHz. And, SIGB 2 may be transmitted through second, fourth, sixth, and eighth 40 MHz channels. That is, an SIGB including SIGB 1 and SIGB 2 may be duplicated on 80 MHz units and may then be transmitted. In other words, the SIGB may be configured of [1 2 1 2 1 2 1 2].

B-i)-b In case four SIGB Content Channels (or SIGB channels) are configured

An SIGB may be independently configured in 40 MHz units at 160 MHz. Additionally, the SIGB may be duplicated on 160 MHz units. For example, when performing SIGB transmission (or when performing PPDU transmission) through 240 MHz, the SIGB may be configured as [1 2 3 4 1 2] and then transmitted. When performing transmission at 320 MHz, the SIGB may be configured as [1 2 3 4 1 2 3 4] and then transmitted.

For example, when performing SIGB transmission through 240 MHz, the SIGB Content Channel 1 may be configured to include information on an STA being allocated to first and/or fifth 40 MHz channel(s) within 240 MHz. And, the SIGB Content Channel 2 may be configured to include information on an STA being allocated to second and/or sixth 40 MHz channel(s).

Figure 21:
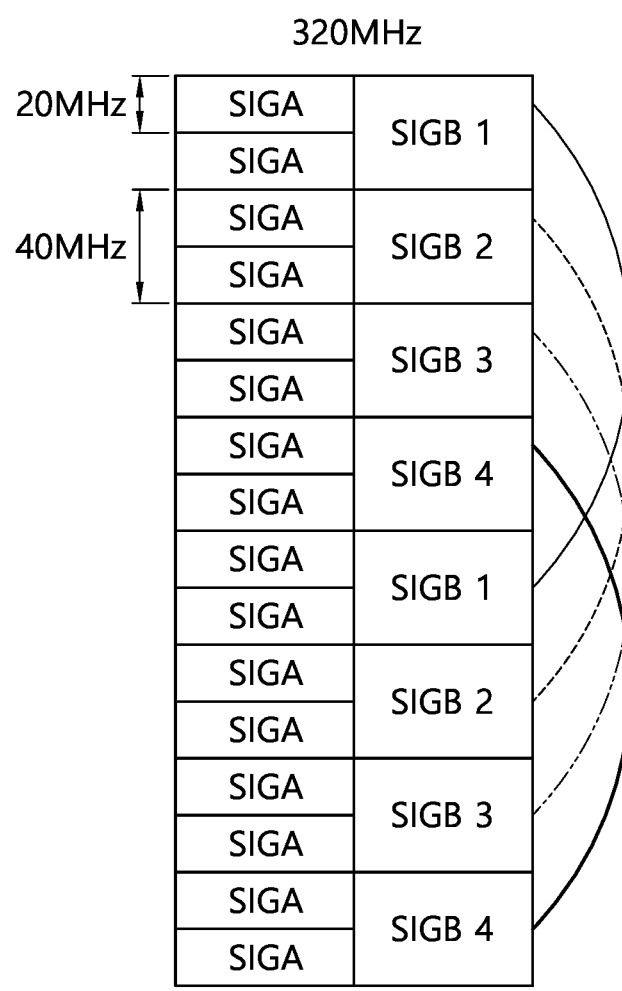
FIG. 21 illustrates an SIGB content channel configuration when performing PPDU transmission through 320 MHz.

As another example, when performing SIGB transmission through 320 MHz, the SIGB Content Channel 1 may be configured to include information on an STA being allocated to first and/or fifth 40 MHz channel(s) within 320 MHz. And, the SIGB Content Channel 2 may be configured to include information on an STA being allocated to second and/or sixth 40 MHz channel(s). SIGB Content Channel 3 may be configured to include information on an STA being allocated to third and/or seventh 40 MHz channel(s). And, the SIGB Content Channel 4 may be configured to include information on an STA being allocated to fourth and/or eighth 40 MHz channel(s). FIG. 21 is a drawing for describing the aforementioned example.

FIG. 21 illustrates an SIGB content channel configuration when performing PPDU transmission through 320 MHz.

Referring to FIG. 21, SIGA may be duplicated on 20 MHz units and may then be transmitted through 320 MHz. SIGB may be duplicated on 160 MHz units and may then be transmitted through 320 MHz. SIGB may be transmitted through four SIGB content channels. More specifically, SIGB 1 may be transmitted through first and fifth 40 MHz channels within 320 MHz. SIGB 2 may be transmitted through second and sixth 40 MHz channels. SIGB 3 may be transmitted through third and seventh 40 MHz channels. And, SIGB 4 may be transmitted through fourth and eighth 40 MHz channels. That is, an SIGB including SIGB 1, SIGB 2, SIGB 3, and SIGB 4 may be duplicated on 80 MHz units and may then be transmitted. In other words, the SIGB may be configured of [1 2 3 4 1 2 3 4].

Figure 22:
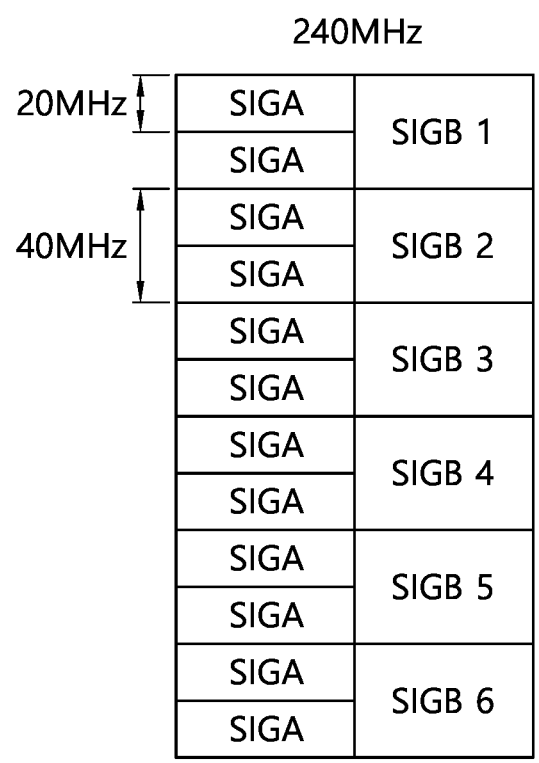
FIG. 22 illustrates an SIGB content channel configuration when performing PPDU transmission through 240 MHz.

B-i)-c Unlike the embodiments of the above-described sections B-i)-a and B-i)-b, an SIGB channel may be independently configured in 40 MHz channel units and may then be transmitted. For example, when performing 240 MHz transmission, SIGB may be configured as [1 2 3 4 5 6] and may then be transmitted. FIG. 22 is a drawing for describing the aforementioned example.

FIG. 22 illustrates an SIGB content channel configuration when performing PPDU transmission through 240 MHz.

Referring to FIG. 22, SIGA may be duplicated on 20 MHz units and may then be transmitted through 320 MHz. SIGB may be transmitted through six SIGB content channels. More specifically, SIGB 1 may be transmitted through a first 40 MHz channel. SIGB 2 may be transmitted through a second 40 MHz channel. SIGB 3 may be transmitted through a third 40 MHz channel. SIGB 4 may be transmitted through a fourth 40 MHz channel. SIGB 5 may be transmitted through a fifth 40 MHz channel. And, SIGB 6 may be transmitted through a sixth 40 MHz channel. In other words, the SIGB may be configured of [1 2 3 4 5 6].

B-ii) In case the SIGB is configured in 80 MHz units (or channel units)

B-ii)-a In case two SIGB Content Channels (or SIGB channels) are configured

An SIGB may be independently configured in 80 MHz units at 160 MHz. Additionally, the SIGB may be duplicated on 160 MHz units. For example, when performing SIGB transmission (or when performing PPDU transmission) through 240 MHz, the SIGB may be configured as [1 1 2 1] and then transmitted. When performing transmission at 320 MHz, the SIGB may be configured as [1 2 1 2] and then transmitted.

For example, when performing SIGB transmission at 240 MHz, the SIGB Content Channel 1 may be configured to include information on an STA being allocated to first and/or third 80 MHz channel(s) within 240 MHz. And, the SIGB Content Channel 2 may be configured to include information on an STA being allocated to a second 80 MHz channel.

Figure 23:
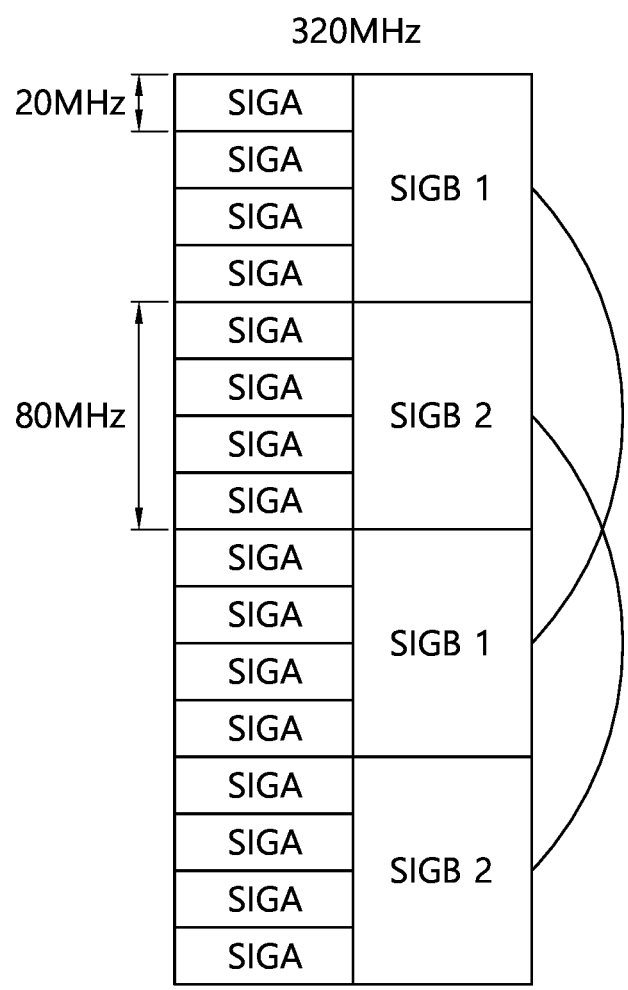
FIG. 23 illustrates an SIGB content channel configuration when performing PPDU transmission through 320 MHz.

As another example, when performing SIGB transmission at 320 MHz, the SIGB Content Channel 1 may be configured to include information on an STA being allocated to first and/or third 80 MHz channel(s) within 320 MHz. And, the SIGB Content Channel 2 may be configured to include information on an STA being allocated to second and/or fourth 80 MHz channel(s). FIG. 23 is a drawing for describing the aforementioned example.

FIG. 23 illustrates an SIGB content channel configuration when performing PPDU transmission through 320 MHz.

Referring to FIG. 23, SIGA may be duplicated on 20 MHz units and may then be transmitted through 320 MHz. SIGB may be duplicated on 160 MHz units and may then be transmitted through 320 MHz. SIGB may be transmitted through two SIGB content channels. More specifically, SIGB 1 may be transmitted through first and third 80 MHz channels within 320 MHz. And, SIGB 2 may be transmitted through second and fourth 80 MHz channels. In other words, the SIGB may be configured of [1 2 1 2].

B-ii)-b In case four SIGB Content Channels (or SIGB channels) are configured

An SIGB may be independently configured in 80 MHz units at 320 MHz. Additionally, the SIGB may be duplicated on 320 MHz units. For example, when performing SIGB transmission through 240 MHz, the SIGB may be configured as [1 2 3] and then transmitted. When performing SIGB transmission at 320 MHz, the SIGB may be configured as [1 2 3 4] and then transmitted.

For example, when performing SIGB transmission through 240 MHz, the SIGB Content Channel 1 may be configured to include information on an STA being allocated to a first 80 MHz channel within 240 MHz. The SIGB Content Channel 2 may be configured to include information on an STA being allocated to a second 80 MHz channel. And, the SIGB Content Channel 3 may be configured to include information on an STA being allocated to a third 80 MHz channel.

As another example, when performing SIGB transmission through 320 MHz, the SIGB Content Channel 1 may be configured to include information on an STA being allocated to a first 80 MHz channel within 320 MHz. The SIGB Content Channel 2 may be configured to include information on an STA being allocated to a second 80 MHz channel. The SIGB Content Channel 3 may be configured to include information on an STA being allocated to a third 80 MHz channel. And, the SIGB Content Channel 4 may be configured to include information on an STA being allocated to a fourth 80 MHz channel.

Figure 24:
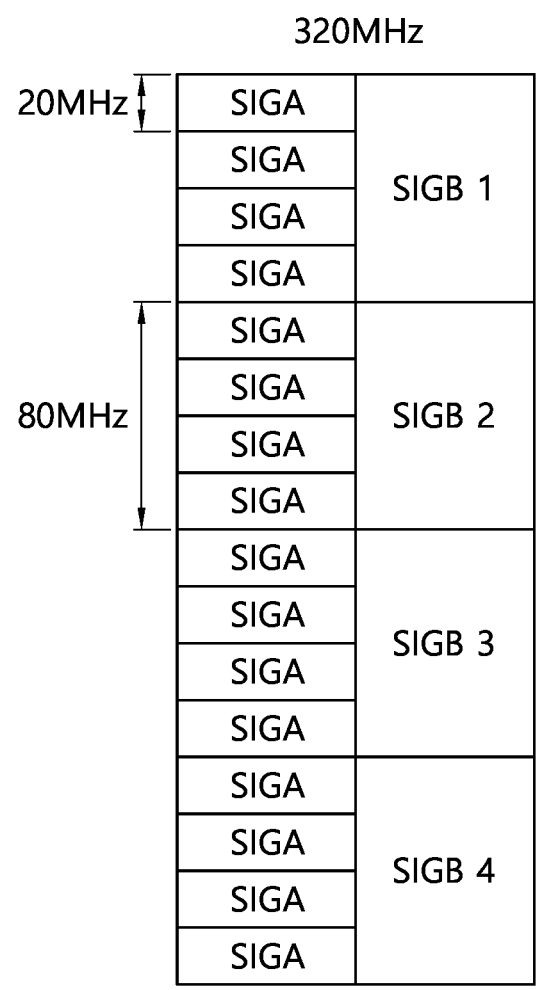
FIG. 24 illustrates an SIGB content channel configuration when performing PPDU transmission through 320 MHz.

FIG. 24 illustrates an SIGB content channel configuration when performing PPDU transmission through 320 MHz.

Referring to FIG. 24, SIGA may be duplicated on 20 MHz units and may then be transmitted through 320 MHz. SIGB may be duplicated on 160 MHz units and may then be transmitted through 320 MHz. SIGB may be transmitted through two SIGB content channels. More specifically, SIGB 1 may be transmitted through first and third 80 MHz channels within 320 MHz. SIGB 2 may be transmitted through second and fourth 80 MHz channels. That is, an SIGB including SIGB 1 and SIGB 2 may be duplicated on 160 MHz units and may then be transmitted. In other words, the SIGB may be configured of [1 2 1 2].

Unlike the embodiments of the above-described sections B-ii)-a and B-ii)-b, an SIGB channel may be independently configured in 80 MHz channel units and may then be transmitted. For example, when performing 240 MHz transmission, SIGB may be configured as [1 2 3] and may then be transmitted.

C. Unlike the embodiments of the above-described A and B, a method for transmitting information on an STA, after varying the configuration of SIGB content channels for 240 MHz and 320 MHz.

C-i) SIGB content channels for 240 MHz may be configured of three channels. SIGB may be transmitted through three SIGB content channels for 240 MHz. SIGB content channels for 320 MHz may be configured of two channels or four channels. SIGB may be transmitted through two or four SIGB content channels for 320 MHz.

C-ii) When performing SIGB transmission through 240 MHz, the SIGB content channels may be configured of three channels in order to transmit the information on an STA. At this point, the SIGB content channels may be configured of 40 MHz-unit or 80 MHz-unit granularity.

For example, when performing SIGB transmission through 240 MHz, the SIGB may be configured in 40 MHz units. At this point, the SIGB may be configured as [1 1 2 3 1 2 3]. As another example, the SIGB may be configured in 80 MHz units. At this point, the SIGB may be configured as [1 1 2 3].

As another example, when performing SIGB transmission through 240 MHz, the SIGB may be configured in 40 MHz units. The SIGB Content Channel 1 may be configured to include information on an STA being allocated to first and/or fourth 40 MHz channel(s) within 240 MHz. The SIGB Content Channel 2 may be configured to include information on an STA being allocated to second and/or fifth 40 MHz channel(s). The SIGB Content Channel 3 may be configured to include information on an STA being allocated to third and/or sixth 40 MHz channel(s).

Figure 25:
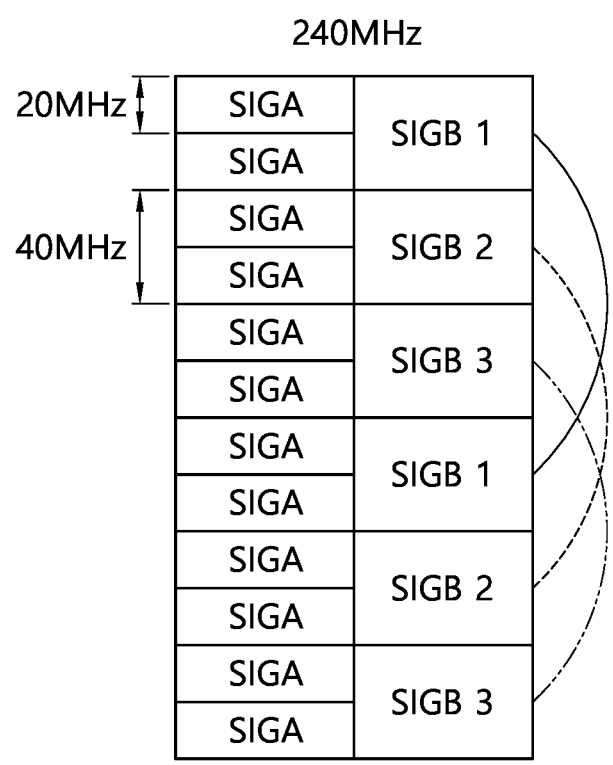
FIG. 25 illustrates an SIGB content channel configuration when performing PPDU transmission through 240 MHz.

FIG. 25 illustrates an SIGB content channel configuration when performing PPDU transmission through 240 MHz.

Referring to FIG. 25, SIGA may be duplicated on 20 MHz units and may then be transmitted through 240 MHz. SIGB may be duplicated on 120 MHz units and may then be transmitted through 240 MHz. SIGB may be transmitted through three SIGB content channels. More specifically, SIGB 1 may be transmitted through first and fourth 40 MHz channels within 240 MHz. SIGB 2 may be transmitted through second and fifth 40 MHz channels. And, SIGB 3 may be transmitted through third and sixth 40 MHz channels. That is, an SIGB including SIGB 1, SIGB 2, and SIGB 3 may be duplicated on 120 MHz units and may then be transmitted. In other words, the SIGB may be configured of [1 2 3 1 2 3].

D. When performing SIGB transmission through a wide bandwidth, SIGB including information on an STA may be configured in 40 MHz or 80 MHz units. In this case, a larger amount of information may be transmitted as compared to when performing transmission through 20 MHz. Thus, signal overhead may be reduced. Additionally, instead of allocation information being configured in 20 MHz units, allocation information being configured of 40 MHz or 80 MHz units may be configured and then transmitted. In this case, the signaling overhead that is needed for the allocation information may be reduced.

E. Method for transmitting information on SIGB content channels through a common control field (e.g., SIGA), which is transmitted before the SIGB, in order to use different configurations of SIGB channels for a wide bandwidth E-i) SIGB content channel (or SIGB channel) information being transmitted through SIGA may be configured to include at least one of the following information types (E-i)-a or E-i)-b).

E-i)-a Information on an SIGB content channel bandwidth (1 bit or 2 bits)

For example, in case the information on an SIGB content channel bandwidth is configured of 1 bit, the information on an SIGB content channel bandwidth may be set to a first value (e.g., {0}). Up to 160 MHz, the first value may include information indicating that the SIGB content channel being configured in 20 MHz is used, just as the conventional method. As another example, the information on an SIGB content channel bandwidth may be set to a second value (e.g., {1}). The second value may include information indicating that the SIGB content channel is configured in 40 MHz or 80 MHz units.

E-i)-b Information on a number of SIGB content channels

The information on a number of SIGB content channels may include information on a number of SIGB content channels transmitting information on an STA. The information on a number of SIGB content channels may be configured of 1 bit or 2 bits. For example, the information on a number of SIGB content channels may be configured of 1 bit. If the SIGB content channels are configured of two channels, the information on a number of SIGB content channels may be set to a first value (e.g., {0}). If the SIGB content channels are configured of three or four channels, the information on a number of SIGB content channels may be set to a second value (e.g., {1}). The information on a number of SIGB content channels may indicate the number of SIGB content channels to the STA. That is, the STA may verify (or confirm) the number of SIGB content channels through this information.

F. The method for configuring and transmitting SIGB through a wide bandwidth may be applied starting from a signal transmission through 160 MHz. A signal may be transmitted by using the above-described method for configuring and transmitting SIGB.

2. Second Embodiment—Method for Configuring an SIGB in 40 MHz or 80 MHz Units A. A SIGB for the Beyond 11ax standard (e.g., 802.11be standard (i.e., EHT standard)) may be configured in 40 MHZ or 80 MHz units. At this point, in order to reduce signaling overhead when performing wide bandwidth transmission, the SIGB may be configured by using various methods. The detailed methods may hereinafter be described.

A-i) Method of configuring an independent SIGB in 40 MHz or 80 MHz units and transmitting the SIGB For example, in case of transmitting SIGB through 320 MHz, the SIGB may be configured in 40 MHz or 80 MHz units. For each 40 MHz or 80 MHz channel, the SIGB may include information on an STA being allocated to the corresponding channel. The SIGB being configured in 40 MHz or 80 MHz units may be transmitted through 320 MHz.

In the above case, SIGB content channels may be configured as individual channels. The receiving STA may detect an SIGB content channel being transmitted for each 40 MHz or 80 MHz. By using an SIGB content channel that includes information on itself, the receiving STA may recognize the information that is allocated to the receiving STA itself.

For example, in case the SIGB is transmitted through 240 MHz, and in case the SIGB content channel is configured in 40 MHz units, the SIGB content channel may be configured as [1 1 2 3 4 5 6].

As another example, in case the SIGB is transmitted through 240 MHz, and in case the SIGB content channel is configured in 80 MHz units, the SIGB content channel may be configured as [1 2 3].

As yet another example, in case the SIGB is transmitted through 320 MHz, and in case the SIGB content channel is configured in 40 MHz units, the SIGB content channel may be configured as [1 2 3 4 5 6 7 8].

As yet another example, in case the SIGB is transmitted through 320 MHz, and in case the SIGB content channel is configured in 80 MHz units, the SIGB content channel may be configured as [1 2 3 4].

The SIGB being configured in 40 MHz or 80 MHz units may include allocation information for 40 MHz or 80 MHz. According to an embodiment of configuring each SIGB in 40 MHz or 80 MHz units, the signaling overhead may be more reduced as compared to the method of the conventional standard (e.g., 802.11ax standard), wherein the SIGB is configured in 20 MHz units and then duplicated.

A-ii) Method of configuring SIGB in 40 MHz or 80 MHz units, duplicating the SIGB in 80 MHz or 160 MHz units and transmitting the duplicated SIGB A-ii)-a Within 80 MHz or 160 MHz, the SIGB content channel may be configured as [1 2]. And, within 80 MHz or 160 MHz, each SIGB content channel may be independently configured.

A-ii)-a The SIGB may be transmitted by using two SIGB content channels. According to the 40 or 80 MHz SIGB granularity, the SIGB content channels may be configured by using the method described below. For example, in case of configuring the SIGB in 40 MHz units, and when performing SIGB transmission through 240 MHz, the SIGB content channel may be configured as [1 2 1 2 1 2]. As another example, in case of configuring the SIGB in 40 MHz units, and when performing SIGB transmission through 320 MHz, the SIGB content channel may be configured as [1 2 1 2 1 2 1 2].

More specifically, when performing SIGB content channel transmission through 240 MHz, the SIGB Content Channel 1 may be configured to include information on an STA being allocated to first, third, and/or fifth 40 MHz channels within 240 MHz. And, the SIGB Content Channel 2 may be configured to include information on an STA being allocated to second, fourth, and/or sixth 40 MHz channels.

Additionally, when performing SIGB transmission through 320 MHz, the SIGB Content Channel 1 may be configured to include information on an STA being allocated to first, third, fifth, and/or seventh 40 MHz channels within 320 MHz. And, the SIGB Content Channel 2 may be configured to include information on an STA being allocated to second, fourth, sixth, and/or eighth 40 MHz channels.

Since the SIGB is configured in 40 MHz or 80 MHz units, in case of transmitting the SIGB by using a narrower bandwidth, a larger number of bits may be used for the allocation. In this case, the overhead may be increased.

FIG. 26 to FIG. 30 respectively illustrate an SIGB content channel configuration when performing PPDU transmission through 40/80/160/240/320 MHz.

Figure 26:
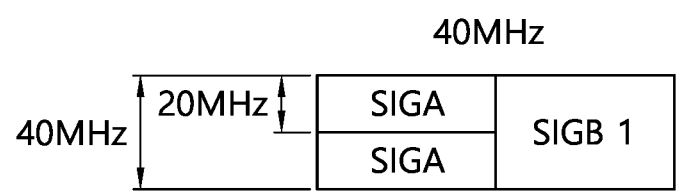
FIG. 26 to FIG. 30 respectively illustrate an SIGB content channel configuration when performing PPDU transmission through 40/80/160/240/320 MHz.

Referring to FIG. 26, SIGA may be duplicated on 20 MHz units and then transmitted through 40 MHz. And, SIGB may be configured of 40 MHz and then transmitted through 40 MHz.

Figure 27:
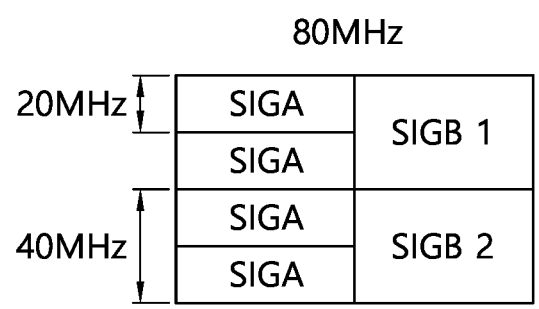

Referring to FIG. 27, SIGA may be duplicated on 20 MHz units and then transmitted through 80 MHz. And, SIGB may be configured of 40 MHz and then transmitted through 80 MHz. More specifically, SIGB 1 may be transmitted through a first 40 MHz channel within 80 MHz. And, SIGB 2 may be transmitted through a second 40 MHz channel within 80 MHz.

Figure 28:
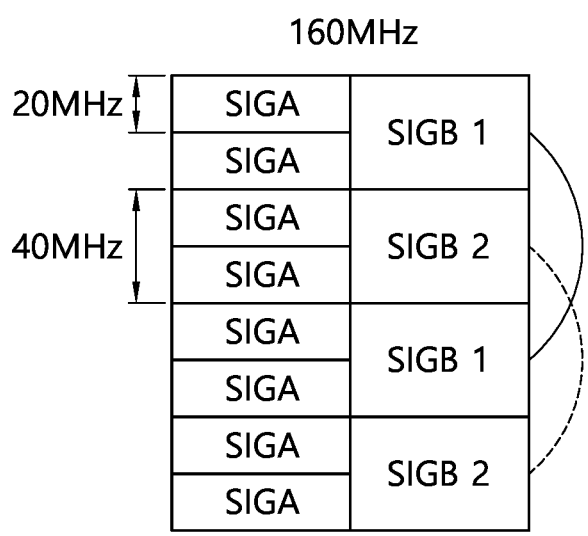

Referring to FIG. 28, SIGA may be duplicated on 20 MHz units and then transmitted through 160 MHz. And, SIGB may be configured of 40 MHz and then transmitted through 160 MHz. At this point, SIGB may be duplicated on 80 MHz units. More specifically, SIGB 1 may be transmitted through first and third 40 MHz channels within 160 MHz. And, SIGB 2 may be transmitted through second and fourth 40 MHz channels within 160 MHz.

Figure 29:
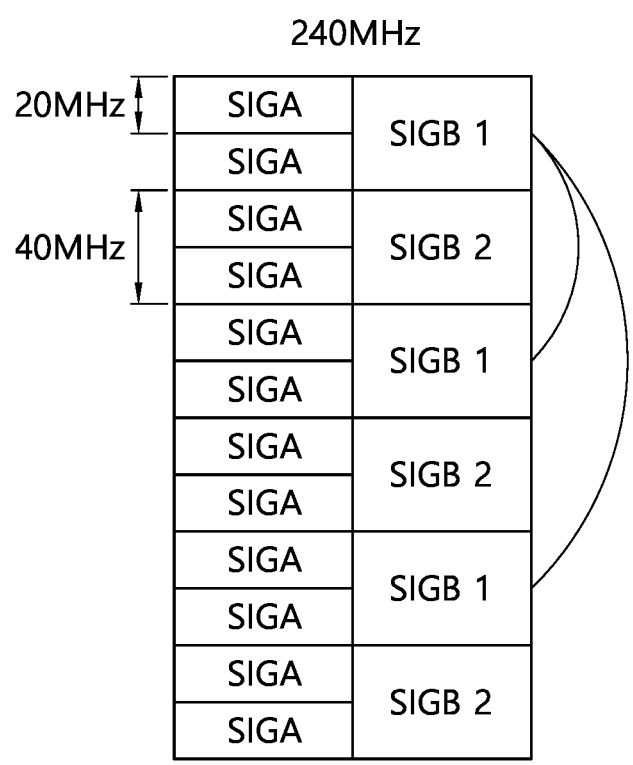

Referring to FIG. 29, SIGA may be duplicated on 20 MHz units and then transmitted through 240 MHz. And, SIGB may be configured of 40 MHz and then transmitted through 240 MHz. At this point, SIGB may be duplicated on 80 MHz units. More specifically, SIGB 1 may be transmitted through first, third, and fifth 40 MHz channels within 240 MHz. And, SIGB 2 may be transmitted through second, fourth, and sixth 40 MHz channels within 240 MHz.

Figure 30:
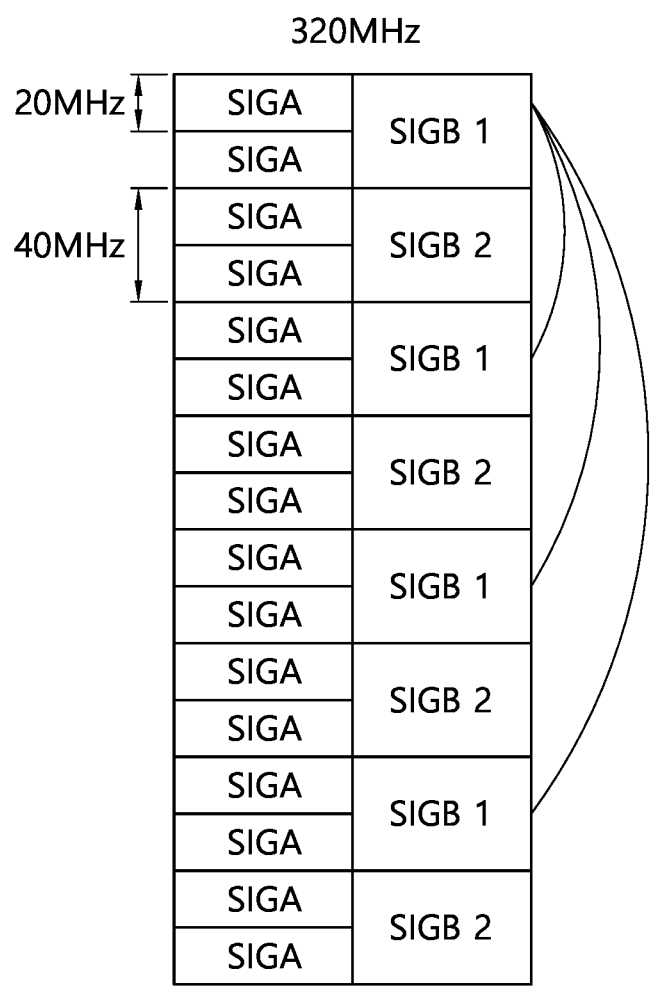

Referring to FIG. 30, SIGA may be duplicated on 20 MHz units and then transmitted through 320 MHz. And, SIGB may be configured of 40 MHz and then transmitted through 320 MHz. At this point, SIGB may be duplicated on 80 MHz units. More specifically, SIGB 1 may be transmitted through first, third, fifth, and seventh 40 MHz channels within 320 MHz. And, SIGB 2 may be transmitted through second, fourth, sixth, and eighth 40 MHz channels within 320 MHz.

3. Third Embodiment—Method for Configuring an SIGB in 20 MHz Units and Transmitting the SIGB after Duplicating the SIGB in 80 MHz Units A. The SIGB may be configured in 20 MHz units just as in the 802.11ax standard. Additionally, SIGB may be independently configured in 20 MHz units within 80 MHz.

B. In 80 MHz, an SIGB content channel may be configured as [1 2 3 4]. Additionally, the SIGB content channel may be duplicated on 80 MHz units.

B-i) For example, in case of transmitting a signal by using 240 or 320 MHz, within 80 MHz, the SIGB may be configured in 20 MHz units. The SIGB may be duplicated on 80 MHz units. Therefore, for the 240 MHz or 320 MHz transmission, the SIGB may be configured as [1 2 3 4 1 2 3 4 1 2 3 4] or [1 2 3 4 1 2 3 4 1 2 3 4 1 2 3 4].

B-ii) When performing SIGB transmission through 320 MHz, the SIGB Content Channel 1 may include information on 20 MHz channels corresponding to first, fifth, ninth, and thirteenth channels. The SIGB Content Channel 2 may include information on 20 MHz channels corresponding to second, sixth, tenth, and fourteenth channels. The SIGB Content Channel 3 may include information on 20 MHz channels corresponding to third, seventh, eleventh, and fifteenth channels. And, the SIGB Content Channel 4 may include information on 20 MHz channels corresponding to fourth, eighth, twelfth, and sixteenth channels.

B-iii) According to the above-described embodiment, the SIGB structure of the 802.11ax standard may be re-used. Additionally, when performing transmission through a wide bandwidth, signaling overhead of the SIGB may be reduced.

B-iv) The above-described SIGB configuration may be applied starting from the 80 MHz transmission.

B-v) In bandwidths of 160 MHz or narrower, the SIGB may be configured by using the same method as the 802.11ax standard. And, for 240 or 320 MHz, a signal may be transmitted through the above-described embodiment. According to the embodiment, user specific information for the STA may be transmitted through the above-described embodiment starting from the 160 MHz transmission.

Figure 31:
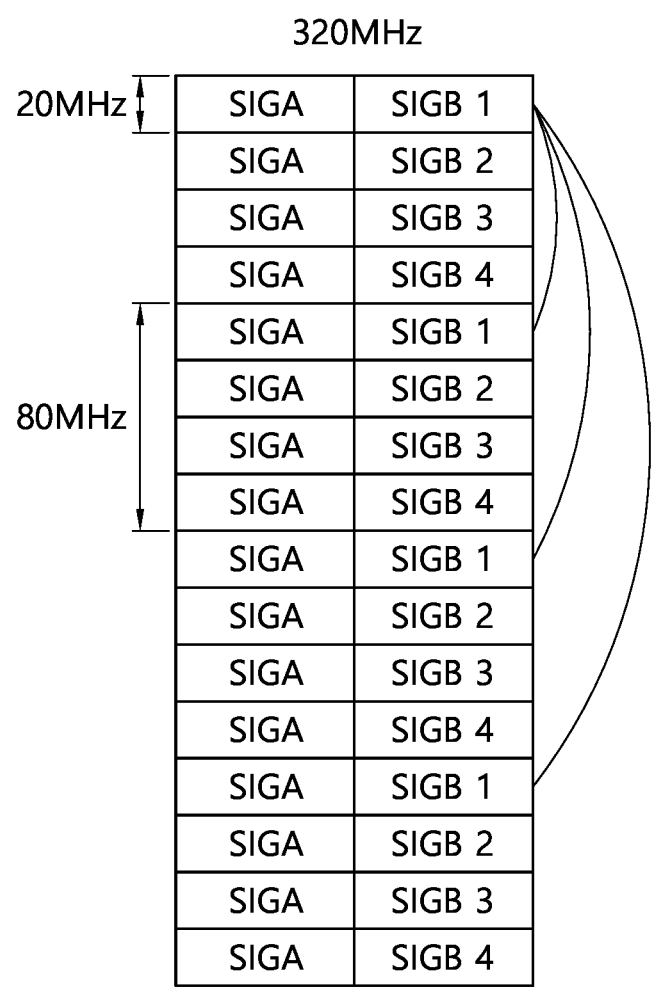
FIG. 31 illustrates an SIGB content channel configuration when performing PPDU transmission through 320 MHz.

FIG. 31 illustrates an SIGB content channel configuration when performing PPDU transmission through 320 MHz.

Referring to FIG. 31, SIGA may be duplicated on 20 MHz units and then transmitted through 320 MHz. And, SIGB may be configured of 20 MHz and then transmitted through 320 MHz. At this point, SIGB may be duplicated on 80 MHz units.

More specifically, SIGB 1 may be transmitted through the first, fifth, ninth, and thirteenth 20 MHz channels within 320 MHz. SIGB 2 may be transmitted through the second, sixth, tenth, and fourteenth 20 MHz channels within 320 MHz. SIGB 3 may be transmitted through the third, seventh, eleventh, and fifteenth 20 MHz channels within 320 MHz. And, SIGB 4 may be transmitted through the fourth, eighth, twelfth, and sixteenth 20 MHz channels within 320 MHz.

4. Fourth Embodiment—Method for Transmitting a Signal after Additionally Allocating an SIGB Channel for a Transmission being Performed Through a Bandwidth of 160 MHz or Wider A. For the 160 MHz transmission, a signal may be transmitted by using the SIGB configuration method, which is defined in the 802.11ax standard.

B. For the 240 or 320 MHz transmission, an SIGB channel may be additionally configured so as to transmit a signal. That is, for the additional 80 or 160 MHz, and SIGB channel may be separately configured so as to transmit a signal.

B-i) For example, in bandwidths of 160 MHz or narrower, a signal may be transmitted by using SIGB Content Channel 1 and SIGB Content Channel 2. And, in 240 or 320 MHz, a signal may be transmitted by using SIGB Content Channels 1, 2, 3, and 4. That is, when performing 320 MHz transmission, in the first 160 MHz, a signal may be transmitted by using SIGB Content Channels 1 and 2. And, in the second 160 MHz, a signal may be transmitted by using SIGB Content Channels 3 and 4.

B-ii) The SIGB may be configured in 20 MHz units. When performing 40 MHz transmission, the SIGB may be configured as an independent SIGB for each 20 MHz channel.

B-iii) An SIGB for a wide bandwidth may be duplicated on 40 MHz units and may then be transmitted.

B-iv) For example, when performing 240 MHz or 320 MHz transmission, the SIGB may each be configured as [1 2 1 2 1 2 1 2 3 4 3 4] or [1 2 1 2 1 2 1 2 3 4 3 4 3 4 3 4]. The SIGB Content Channel 3 may be configured to include information on an STA being allocated to ninth, eleventh, thirteenth, and fifteenth 20 MHz channels. And, the SIGB Content Channel 4 may be configured to include information on an STA being allocated to tenth, twelfth, fourteenth, and sixteenth 20 MHz channels.

Figure 32:
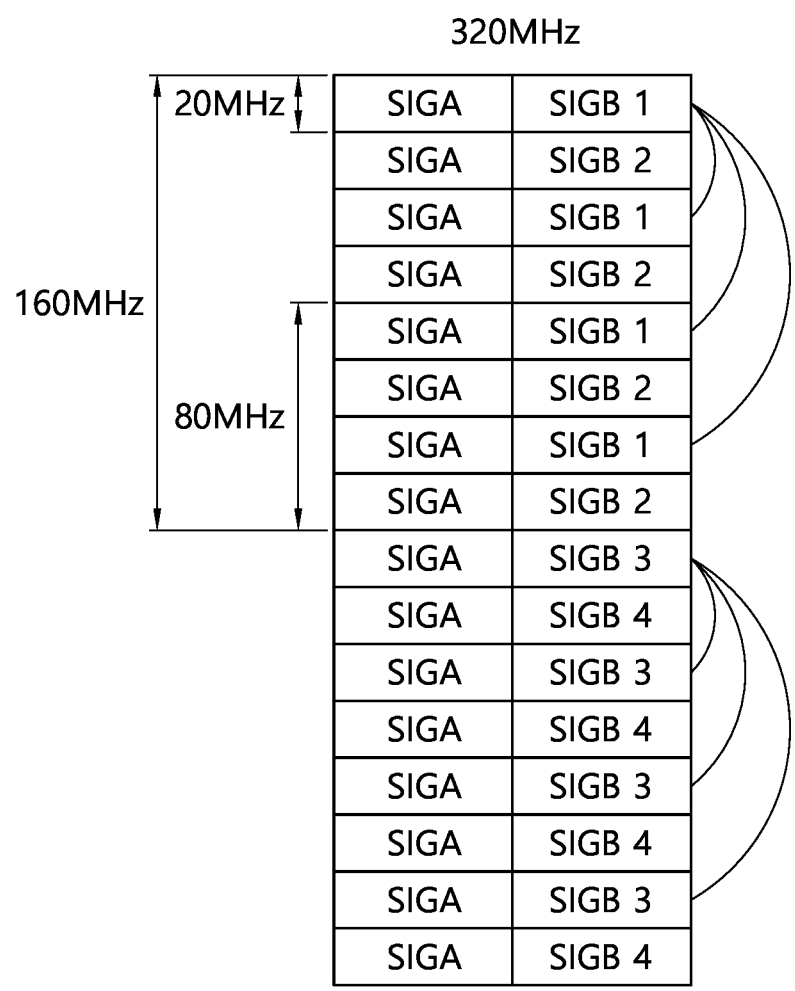
FIG. 32 illustrates an SIGB content channel configuration when performing PPDU transmission through 320 MHz.

FIG. 32 illustrates an SIGB content channel configuration when performing PPDU transmission through 320 MHz.

Referring to FIG. 32, SIGA may be duplicated on 20 MHz units and then transmitted through 320 MHz. In the first 160 MHz, SIGB 1 and SIGB 2 may be transmitted. And, in the second 160 MHz, SIGB 3 and SIGB 4 may be transmitted. More specifically, the SIGB may be configured as [1 2 1 2 1 2 1 2 3 4 3 4 3 4 3 4].

According to the various embodiments of the present specification, after assuming that an SIGA transmitting common control information is duplicated on 20 MHz units and then transmitted, the SIGB configuration is proposed. According to the various embodiments of the present specification, the SIGB configuration may not be restricted to the configuration of the SIGA. For example, even in a case where the SIGA is transmitted in 40 MHz or 80 MHz units, various embodiments of the present specification may be applied.

Figure 33:
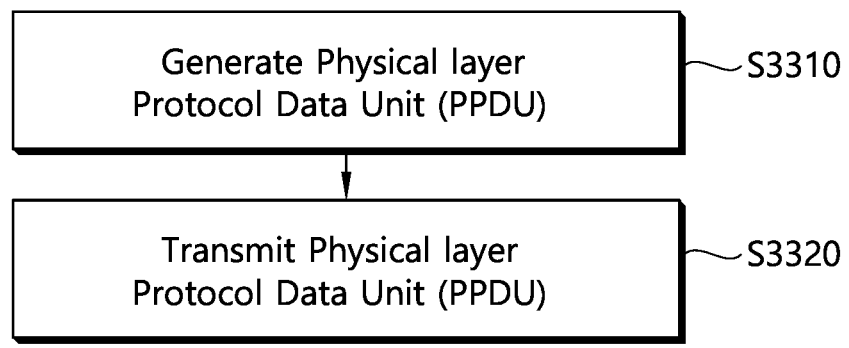
FIG. 33 is a flowchart for describing exemplary operations of a transmitting STA.

FIG. 33 is a flowchart for describing exemplary operations of a transmitting STA.

Referring to FIG. 33, in step S3310, the transmitting STA may generate a PPDU. More specifically, the PPDU may include a control information field, a plurality of Signal fields, and a plurality of Data fields.

The control information field may include control information for interpreting the PPDU. For example, the control information field may include information related to a bandwidth of a channel (e.g., SIGB Content Channel) for transmitting the plurality of Signal fields, and information related to a number of channels for transmitting the plurality of Signal fields.

One control information field may have a first bandwidth. For example, one control information field may have a bandwidth of 20 MHz.

The transmitting STA may duplicate the control information field based on the first bandwidth. That is, the control information field may be duplicated based on the first bandwidth. More specifically, the control information field may be duplicated on first bandwidth units. For example, the control information field may be duplicated on 20 MHz units. In case the PPDU is transmitted through 240 MHz, the control information field may be duplicated on 12 units and then transmitted.

The plurality of Signal fields may include a first Signal field and a second Signal field. Each of the first Signal field and the second Signal field may have a second bandwidth. Each of the first Signal field and the second Signal field may be duplicated based on the second bandwidth. More specifically, each of the first Signal field and the second Signal field may be duplicated on second bandwidth units. The second bandwidth may be configured to be wider than the first bandwidth. For example, the first bandwidth may be configured as 40 MHz, and the second bandwidth may be configured as 40 MHz. The first bandwidth and the second bandwidth may each be duplicated on 40 MHz units. Additionally, the first bandwidth and the second bandwidth may be collectively duplicated on 80 MHz units.

In step S3320, the transmitting STA may transmit the PPDU. For example, the transmitting STA may transmit the PPDU through one of 20, 40, 80, 160, 240, or 320 MHz.

The plurality of Data fields may include a plurality of odd-numbered data fields being transmitted through a plurality of odd-numbered data subchannels and a plurality of even-numbered data fields being transmitted through a plurality of even-numbered data subchannels.

The first Signal field may be configured to be used for the decoding of the plurality of odd-numbered data fields. And, the second Signal field may be configured to be used for the decoding of the plurality of even-numbered data fields.

Figure 34:
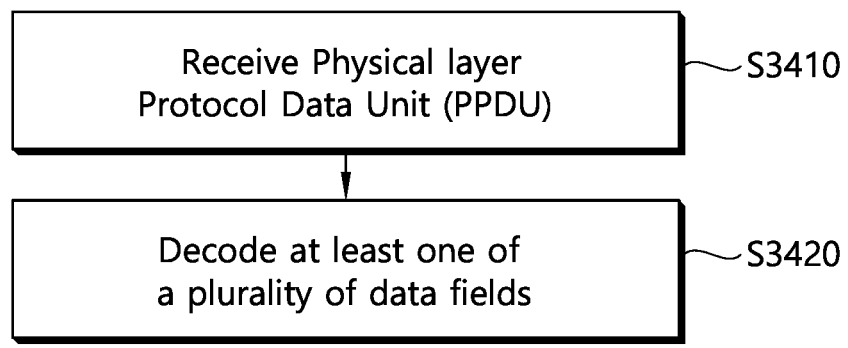
FIG. 34 is a flowchart for describing exemplary operations of a receiving STA.

FIG. 34 is a flowchart for describing exemplary operations of a receiving STA.

Referring to FIG. 34, in step S3410, the receiving STA may receive a Physical layer Protocol Data Unit (PPDU). More specifically, the receiving STA may receive a PPDU including a control information field, a plurality of Signal fields, and a plurality of Data fields. For example, the receiving STA may receive a PPDU through one of 20, 40, 80, 160, 240, or 320 MHz.

The control information field may include control information for interpreting the PPDU. For example, the control information field may include information related to a bandwidth of a channel (e.g., SIGB Content Channel) for transmitting the plurality of Signal fields, and information related to a number of channels for transmitting the plurality of Signal fields.

One control information field may have a first bandwidth. For example, one control information field may have a bandwidth of 20 MHz.

The control information field may be duplicated based on the first bandwidth. More specifically, the control information field may be duplicated on first bandwidth units. For example, the control information field may be duplicated on 20 MHz units. In case the PPDU is transmitted through 240 MHz, the control information field may be duplicated on 12 units.

The plurality of Signal fields may include a first Signal field and a second Signal field. Each of the first Signal field and the second Signal field may have a second bandwidth. Each of the first Signal field and the second Signal field may be duplicated based on the second bandwidth. More specifically, each of the first Signal field and the second Signal field may be duplicated on second bandwidth units. The second bandwidth may be configured to be wider than the first bandwidth. For example, the first bandwidth may be configured as 40 MHz, and the second bandwidth may be configured as 40 MHz. The first bandwidth and the second bandwidth may each be duplicated on 40 MHz units. Additionally, the first bandwidth and the second bandwidth may be collectively duplicated on 80 MHz units.

In step S3420, the receiving STA may decode at least one of the plurality of Data fields.

The plurality of Data fields may include a plurality of odd-numbered data fields being transmitted through a plurality of odd-numbered data subchannels and a plurality of even-numbered data fields being transmitted through a plurality of even-numbered data subchannels.

The first Signal field may be configured to be used for the decoding of a plurality of odd-numbered data fields. And, the second Signal field may be configured to be used for the decoding of a plurality of even-numbered data fields.

Based on at least one of the first Signal field and the second Signal field, the receiving STA may decode at least one of the plurality of odd-numbered data fields and a plurality of even-numbered data fields.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims specified in the present specification may be combined by various methods. For example, technical features of the method claim(s) of the present specification may be combined so as to be implemented as a device (or apparatus), and technical features of the device claim(s) may be combined so as to be implemented as a method. Additionally, technical features of the method claim(s) of the present specification and technical features of the device claim(s) may be combined so as to be implemented as a device (or apparatus), and technical features of the method claim(s) of the present specification and technical features of the device claim(s) may be combined so as to be implemented as a method.

What is claimed is:

1. A method performed by a station (STA) of a Wireless Local Area Network (WLAN) system, the method comprising:
   receiving a physical protocol data unit (PPDU) including a legacy long training field (L-LTF), a legacy signal (L-SIG) field, a repeated L-SIG (RL-SIG) field, a first SIG field which is contiguous to the RL-SIG field, and a second SIG field which is contiguous to the first SIG field;
   determining whether a first symbol after the L-LTF is configured based on Binary Phase Shift Keying (BPSK);
   determining whether the RL-SIG field is same as the L-SIG field;
   determining whether a length field included in the L-SIG field is set to a value satisfying a condition that a remainder is zero (0) when a value of the length field is divided by three (3); and
   determining the PPDU as an extremely high throughput (EHT) PPDU based on the first symbol being configured based on the BPSK, the RL-SIG field being same as the L-SIG field, and the remainder having a value of zero (0),
   wherein the PPDU is determined as a high efficiency (HE) PPDU based on the remainder having a non-zero value,
   wherein the second SIG field includes a first Signal Content Channel (SIG-CC) and a second SIG-CC, wherein the EHT PPDU includes a first 80 MHz frequency subblock and a second 80 MHz frequency subblock being contiguous to the first 80 MHz frequency subblock, wherein the first 80 MHz frequency subblock includes the first SIG-CC, the second SIG-CC which is contiguous to the first SIG-CC, a duplication of the first SIG-CC which is contiguous to the second SIG-CC, and a duplication of the second SIG-CC which is contiguous to the duplication of the first SIG-CC, wherein information carried in the first 80 MHz frequency subblock is different from information carried in the second 80 MHz frequency subblock.

2. The method of claim 1, wherein each SIG-CC has a bandwidth of 20 MHz and includes a common field and a user specific field.

3. The method of claim 1, wherein the first SIG field includes first bits having a first value based on the PPDU being related to a multi-user (MU) PPDU and having a second value based on the PPDU being related to a trigger-based (TB) PPDU.

4. The method of claim 3, wherein the first SIG field further includes second bits related to an identifier of a basic service set (BSS), third bits related to a duration of a transmission opportunity (TXOP), fourth bits related to a Modulation and Coding Scheme (MCS) used for the second SIG field, and fifth bits related to a bandwidth of the EHT PPDU.

5. A station (STA) in a Wireless Local Area Network (WLAN) system, comprising:
at least one transceiver configured to transmit and/or receive a wireless signal; and
at least one processor coupled to the at least one transceiver,
wherein the at least one processor is adapted to:
receive a physical protocol data unit (PPDU) including a legacy long training field (L-LTF), a legacy signal (L-SIG) field, a repeated L-SIG (RL-SIG) field, a first SIG field which is contiguous to the RL-SIG field, and a second SIG field which is contiguous to the first SIG field;
determine whether a first symbol after the L-LTF is configured based on Binary Phase Shift Keying (BPSK);
determine whether the RL-SIG field is same as the L-SIG field;
determine whether a length field included the L-SIG field is set to a value satisfying a condition that a remainder is zero (0) when a value of the length field is divided by three (3); and
determine the PPDU as an extremely high throughput (EHT) PPDU based on the first symbol being configured based on the BPSK, the RL-SIG field being same as the L-SIG field, and the remainder having a value of zero (0),
wherein the PPDU is determined as the HE PPDU based on the remainder having a non-zero value,
wherein the second SIG field includes a first Signal Content Channel (SIG-CC) and a second SIG-CC,
wherein the EHT PPDU includes a first 80 MHz frequency subblock and a second 80 MHz frequency subblock being contiguous to the first 80 MHz frequency subblock,
wherein the first 80 MHz frequency subblock includes the first SIG-CC, the second SIG-CC which is contiguous to the first SIG-CC, a duplication of the first SIG-CC which is contiguous to the second SIG-CC, and a duplication of the second SIG-CC which is contiguous to the duplication of the first SIG-CC,
wherein information carried in the first 80 MHz frequency subblock is different from information carried in the second 80 MHz frequency subblock.

6. The STA of claim 5, wherein each SIG-CC has a bandwidth of 20 MHz and includes a common field and a user specific field.

7. The STA of claim 5, wherein the first SIG field includes first bits having a first value based on the PPDU being related to a multi-user (MU) PPDU and having a second value based on the PPDU being related to a trigger-based (TB) PPDU.

8. The STA of claim 7, wherein the first SIG field further includes second bits related to an identifier of a basic service set (BSS), third bits related to a duration of a transmission opportunity (TXOP), fourth bits related to a Modulation and Coding Scheme (MCS) used for the second SIG field, and fifth bits related to a bandwidth of the EHT PPDU.

* * * * *